US 12,457,147 B2

United States Patent
Varghese et al.

(10) Patent No.: US 12,457,147 B2
(45) Date of Patent: Oct. 28, 2025

(54) SIGNAL PROCESSING

(71) Applicant: Nordic Semiconductor ASA, Trondheim (NO)

(72) Inventors: George Varghese, Hyderabad (IN); Karthik Khanna Subramani, Hyderabad (IN)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 18/367,935

(22) Filed: Sep. 13, 2023

(65) Prior Publication Data
US 2024/0097962 A1    Mar. 21, 2024

(30) Foreign Application Priority Data

Sep. 15, 2022  (IN) .............................. 202211052823
Nov. 16, 2022  (GB) ..................................... 2217138

(51) Int. Cl.
*H04L 27/38*  (2006.01)
*H04L 27/26*  (2006.01)
*H04L 27/36*  (2006.01)

(52) U.S. Cl.
CPC ...... *H04L 27/3854* (2013.01); *H04L 27/2602* (2013.01); *H04L 27/36* (2013.01)

(58) Field of Classification Search
CPC .. H04L 27/3854; H04L 27/2602; H04L 27/36
See application file for complete search history.

(56) References Cited

U.S. PATENT DOCUMENTS 6,278,685 B1 * 8/2001 Yonge, III .......... H03M 13/271
                                                              375/348
9,294,173 B2    3/2016 Kankipati et al.
2007/0268988 A1  11/2007 Hedayat et al.
(Continued)

OTHER PUBLICATIONS

ISO Combined Search and Examination Report under Sections 17 and 18(3), for GB2217138.3, mailed May 2, 2023, 5 pages.
(Continued)

*Primary Examiner* — David B Lugo
(74) *Attorney, Agent, or Firm* — Klarquist Sparkman, LLP

(57) ABSTRACT

A receiver apparatus for receiving an OFDM radio signal comprising a first plurality of subcarrier-symbols, modulated on a corresponding plurality of subcarriers, and a second plurality of subcarrier-symbols, modulated on the corresponding plurality of subcarriers, to generate first and second bit sequences, the first bit sequence being an interleaved version of the second bit sequence according to a predetermined interleave function. Soft-output decoder logic generates a first soft-bit sequence for the first plurality of subcarrier-symbols, and a second soft-bit sequence for the second plurality of subcarrier-symbols. Combiner logic combines the soft-bit sequences, with the soft-bit sequences either both in an interleaved state or both in a non-interleaved state, by combining a respective soft-bit having a bit position in the first soft-bit sequence with a respective soft-bit having a same bit position in the second soft-bit sequence. Hard-output decoder logic outputs a hard-bit sequence representing the transmitted bit sequence.

18 Claims, 6 Drawing Sheets

(56) References Cited

U.S. PATENT DOCUMENTS

2015/0244499 A1* 8/2015 Alexander ........ H03M 13/4169
 375/341
2017/0187434 A1 6/2017 Hoshi et al.
2017/0207944 A1* 7/2017 Zhang ...................... H04L 9/40

OTHER PUBLICATIONS

Jacob et al., "System-level Performance Comparison of IEEE 802.11p and 802.11bd Draft in Highway Scenarios," *27th International Conference on Telecommunications*, Oct. 2020, 6 pages.

* cited by examiner

SIGNAL PROCESSING

CROSS REFERENCE TO RELATED APPLICATIONS

This application claims priority from Great Britain Application No. 2217138.3, filed Nov. 16, 2022, which claims priority to India Application No. 202211052823, filed Sep. 15, 2022. Both applications are incorporated herein in their entirety.

BACKGROUND OF THE INVENTION

The present disclosure relates to signal processing. In particular, the present disclosure relates to methods and apparatus for processing digitally encoded radio signals using soft-bit decoding.

In digital radio communication, a radio transmitter will typically use any of a number of modulation techniques known in the art per se to alter the properties of a carrier signal such as the amplitude (amplitude modulation), the frequency (frequency modulation), and/or the phase (phase modulation) in response to binary data that is to be transmitted, the data itself being a bitstream of digital "0"s and "1"s. At the receiver side, various detection schemes are available for obtaining the bitstream from the incoming analogue waveform.

However, digital radio signals can often be subject to noise and glitches that may cause uncertainty regarding whether a received bit was a digital "0" or "1". It is therefore important to correctly determine the bit value in order for the data contained within the received signal to be useful.

Orthogonal Frequency Division Multiplexing (OFDM) is a form of radio transmission that is used in various radio protocols such as Long Term Evolution (LTE™), various IEEE™ 802.11 standards, DAB™ radio, DVB-T, and WiMAX™. Rather than encoding data on a single carrier frequency, a data stream is spread over some or all of a radio channel containing multiple subcarriers. For instance, in some protocols, a bitstream might be split into a succession of 52-bit data tuples, with the 52-bit tuples then transmitted as a succession of OFDM symbols over time, where each OFDM symbol represents a respective 52 bit-tuple that is binary-phase-shift-key (BPSK) modulated simultaneously across 52 different subcarrier frequencies. More complex modulation schemes, such as quadrature amplitude modulation (QAM), can enable two or more bits to be represented by each subcarrier-symbol within a single OFDM symbol. The modulated subcarriers are typically closely spaced across the frequency spectrum, although this is not essential. The modulated subcarriers are orthogonal to avoid mutual interference. Introduction of frequency domain diversity means that OFDM techniques can provide good resilience to multipath fading and to external interference and are thus often used for digital radio communication.

A receiver apparatus, such as a cellular user equipment (UE) device or a WiFi™ station (STA), when tuned to a given radio channel comprising a plurality of subcarriers, can receive an OFDM radio signal comprising the plurality of subcarriers and process the subcarriers to recover the bitstream. One approach is to simply perform a thresholding operation for each received bit, assigning each one a definitive "0" or "1" value depending on which it is closer to. Such approaches make a "hard" (i.e. definitive) decision regarding the value that should be assigned based on instantaneous observations. Instead of making hard decisions regarding the bits within a given bitstream, it is known in the art per se to perform so-called "soft" decision decoding. Unlike hard decision decoding, soft decision decoding techniques take into account information corresponding to uncertainty. Various soft output schemes are known which calculate a soft bit that takes on a value indicating a likelihood metric for a bit. These soft-bit values may be further processed to determine a hard-bit decoding of the signal, e.g. by being input to a Viterbi decoder if the transmitted signal has been encoded using a convolutional code.

However, the applicant has recognised that there is potential for further improving the accuracy of decoding data from OFDM signals. Thus the invention seeks to provide improved approaches to decoding OFDM signals.

SUMMARY OF THE INVENTION

According to a first aspect of the present invention, there is provided a receiver apparatus comprising:

receiving circuitry configured to receive an OFDM radio-frequency (RF) signal encoding a transmitted bit sequence, the OFDM radio-frequency signal comprising a first OFDM symbol comprising a first plurality of subcarrier-symbols, modulated on a corresponding plurality of respective subcarriers, and a second OFDM symbol comprising a second plurality of subcarrier-symbols, modulated on the corresponding plurality of respective subcarriers, wherein the first plurality of subcarrier-symbols encodes the transmitted bit sequence as a first bit sequence and the second plurality of subcarrier-symbols encodes the transmitted bit sequence as a second bit sequence, the first bit sequence being an interleaved version of the second bit sequence according to a predetermined interleave function;

soft-output decoder logic configured to: generate a first output comprising a first soft-bit sequence for the first plurality of subcarrier-symbols; and generate a second output comprising a second soft-bit sequence for the second plurality of subcarrier-symbols;

combiner logic configured to combine the first soft-bit sequence and the second soft-bit sequence, with the first soft-bit sequence and the second soft-bit sequence either both in an interleaved state or both in a non-interleaved state, to obtain a combined soft-bit sequence, wherein the combiner logic is configured to combine a respective soft-bit having a bit position in the first soft-bit sequence with a respective soft-bit having a same bit position in the second soft-bit sequence; and hard-output decoder logic configured to output, in dependence upon the combined soft-bit sequence, a hard-bit sequence representing the transmitted bit sequence.

The present invention extends to a method comprising:

receiving an OFDM radio-frequency signal encoding a transmitted bit sequence, the OFDM radio-frequency signal comprising a first OFDM symbol comprising a first plurality of subcarrier-symbols, modulated on a corresponding plurality of respective subcarriers, and a second OFDM symbol comprising a second plurality of subcarrier-symbols, modulated on the corresponding plurality of respective subcarriers, wherein the first plurality of subcarrier-symbols encodes the transmitted bit sequence as a first bit sequence and the second plurality of subcarrier-symbols encodes the transmitted bit sequence as a second bit sequence, the first bit sequence being an interleaved version of the second bit sequence according to a predetermined interleave function;

determining a first soft-bit sequence for the first plurality of subcarrier-symbols;

determining a second soft-bit sequence for the second plurality of subcarrier-symbols;

combining the first soft-bit sequence and the second soft-bit sequence, with the first soft-bit sequence and the second soft-bit sequence either both in an interleaved state or both in a non-interleaved state, to obtain a combined soft-bit sequence, wherein combining the first soft-bit sequence and the second soft-bit sequence comprises combining a respective soft-bit having a bit position in the first soft-bit sequence with a respective soft-bit having a same bit position in the second soft-bit sequence; and generating, in dependence upon the combined soft-bit sequence, a hard-bit sequence representing the transmitted bit sequence.

The present invention further extends to computer software (and to a non-transitory machine-readable medium storing the same) which, when executed by a receiver apparatus, causes the receiver apparatus to:

process data representative of a received OFDM radio signal encoding a transmitted bit sequence, the OFDM radio signal comprising a first OFDM symbol comprising a first plurality of subcarrier-symbols, modulated on a corresponding plurality of respective subcarriers, and a second OFDM symbol comprising a second plurality of subcarrier-symbols, modulated on the corresponding plurality of respective subcarriers, wherein the first plurality of subcarrier-symbols encodes the transmitted bit sequence as a first bit sequence and the second plurality of subcarrier-symbols encodes the transmitted bit sequence as a second bit sequence, the first bit sequence being an interleaved version of the second bit sequence according to a predetermined interleave function;

determine a first soft-bit sequence for the first plurality of subcarrier-symbols;

determine a second soft-bit sequence for the second plurality of subcarrier-symbols;

combine the first soft-bit sequence and the second soft-bit sequence, with the first soft-bit sequence and the second soft-bit sequence either both in an interleaved state or both in a non-interleaved state, to obtain a combined soft-bit sequence, wherein combining the first soft-bit sequence and the second soft-bit sequence comprises combining a respective soft-bit having a bit position in the first soft-bit sequence with a respective soft-bit having a same bit position in the second soft-bit sequence; and generate, in dependence upon the combined soft-bit sequence, a hard-bit sequence representing the transmitted bit sequence.

Impairment of the quality of a particular subcarrier (e.g. due to external factors such as radio channel, noise and interference) can result in errors when decoding the received OFDM radio-frequency signal for that subcarrier. The receiver apparatus in accordance with embodiments of the present invention includes soft-output decoder logic that soft-decodes the first plurality of subcarrier-symbols and the second plurality of subcarrier-symbols to provide the first soft-bit sequence and the second soft-bit sequence, where the first plurality of subcarrier-symbols and second plurality of subcarrier-symbols both encode the same transmitted bit sequence but with time-domain diversity (due to the same information being encoded on each of the two OFDM symbols) as well as with frequency-domain diversity (due to the interleaving being present on only one of the OFDM symbols, which results in the data bits being transmitted at different subcarrier frequencies between the two OFDM symbols).

Therefore, the first soft-bit sequence and the second soft-bit sequence both include a respective soft-bit that relates to a same respective bit of the transmitted bit sequence, for which the two respective soft-bits have been transmitted using both frequency and time diversity. Although such a bit is positioned differently in the transmitted first and second bit sequences, the receiver apparatus is configured to combine the first soft-bit sequence and the second soft-bit sequence with the soft-bit sequences in the same state of interleaving, such that the respective soft-bits have the same position, to obtain a combined soft-bit sequence comprising a combined soft-bit for each bit of the transmitted bit sequence.

The first and second bit sequences are both encoded across the same corresponding subcarriers (i.e. with each bit position being encoded by the same respective subcarrier for both sequences). In other words, the bits of the first bit sequence and the bits of the second bit sequence are modulated on the plurality of subcarriers, by the first and second pluralities of subcarrier-symbols, according to a same correspondence between the bit positions of the sequences (irrespective of the values they hold) and the subcarriers. Thus the different interleaving states of the two sequences may, at least in some embodiments, be seen as equivalent to providing a different ordering of the subcarrier frequencies within the first OFDM symbol compared with the second ODFM symbol. This is especially so when, as in some embodiments, each subcarrier-symbol encodes exactly one bit—e.g. when the bits are modulated onto the respective subcarriers using BPSK and/or QBPSK modulation.

The combiner logic may be configured to combine two respective soft-bits which both relate to a same bit of the transmitted bit sequence and which have frequency and time domain diversity to thereby obtain a combined soft-bit. This can improve reliability for correctly decoding each bit of the transmitted bit sequence. Moreover, because the soft-bit sequences are combined when in the same state of interleaving, the combining can be implemented efficiently. For instance, in some embodiments, combining two soft-bits from the respective sequences simply comprises summing the two soft-bits. The combined soft-bit sequence may be input to the hard-output decoder logic which hard decodes the combined soft-bit sequence to obtain a hard-bit sequence comprising binary bits representing the transmitted bit sequence.

A receiver apparatus embodying the present invention may thus provide more reliable decoding with improved bit error rate (BER) performance as opposed to decoding only one of the two OFDM symbols.

Impairment of the quality of the first and second subcarriers received by the receiver apparatus can be particularly problematic for extended range applications. IEEE 802.11ax, also referred to as high efficiency wireless local area network (HE WLAN), defines a High Efficiency Extended Range (HE-ER) frame format for extended-range transmission. The HE-ER frames generally include a legacy preamble portion for supporting coexistence with legacy STAs and a HE-preamble portion for supporting IEEE 802.11ax features. A High Efficiency Extended Range Single User (HE-ER-SU) frame includes a HE-SIG-A field of 52-bits which comprise information regarding at least a modulation and coding scheme (MCS) index. This HE-SIG-A field can provide information for decoding this and further packets, such as whether the current packet is an uplink or downlink packet, what the transmission bandwidth is, whether the packet can handle Doppler, etc.

Unlike other physical-layer protocol data unit (PPDU) formats, HE-ER-SU transmission uses a repetition of the transmission of the HE-SIG-A field over multiple OFDM symbols for more reliable performance. Some embodiments of the present invention may provide a receiver apparatus and methods for improved decoding for IEEE 802.11ax. Specifically, the receiver apparatus may provide the above mentioned combined soft-bit sequence for at least a portion (or an entirety) of the bit sequence transmitted for the HE-SIG-A field of an HE-ER-SU frame and thereby provide more reliable decoding of the HE-SIG-A field.

The first and second OFDM symbols may occupy adjacent symbol periods in the OFDM signal, although in some embodiments they could be separated by one, two or more other OFDM symbols. The first OFDM symbol may precede the second OFDM symbol in the OFDM signal, or the second OFDM symbol may precede the first OFDM symbol.

The two soft-bit sequences are processed in the combiner logic in a same interleaving state—i.e. with both in the interleaved state or both in the non-interleaved state. Embodiments of the invention provide a number of possibilities for obtaining two interleaved or two non-interleaved soft-bit sequences within the combiner logic. The receiver apparatus may comprise reordering logic configured to reorder one or both of the first and second soft-bit sequences so that both soft-bit sequences are interleaved or both are non-interleaved. In particular, the receiver apparatus may comprise one or more interleavers and/or one or more de-interleavers. Interleaving and/or de-interleaving may be applied to the decoded bits (i.e. after the soft decoding) and/or to subcarrier-symbols (e.g. waveform samples in the frequency-domain) before they are soft decoded.

In some embodiments the receiver apparatus comprises de-interleaver logic configured to de-interleave the first soft-bit sequence generated by the soft-output decoder logic according to a predetermined de-interleave function to obtain the first soft-bit sequence in a non-interleaved state. The first OFDM symbol comprises the first plurality of subcarrier-symbols encoding the interleaved version of the transmitted bit sequence. The soft-output decoder logic decodes the first plurality of subcarrier-symbols and thus generates one or more soft-bits for each of the first plurality of subcarrier-symbols, and the resulting first soft-bit sequence therefore comprises a sequence of soft-bits corresponding to the interleaved state of the transmitted bit sequence. Therefore, in some embodiments the receiver apparatus comprises the de-interleaver logic to de-interleave the first soft-bit sequence according to a predetermined de-interleave function. The predetermined de-interleave function is related to (e.g. is the inverse of) the predetermined interleave function in that the predetermined de-interleave function reverses the bit reordering caused by the predetermined interleave function. Therefore, the de-interleaver logic performs bit re-ordering for the first soft-bit sequence to obtain the first soft-bit sequence in a de-interleaved state (also referred to herein as a non-interleaved state). Accordingly, in this case the combiner logic may be configured to receive the first soft-bit sequence and the second soft-bit sequence both in the non-interleaved state and perform soft-bit combining to combine respective bits having same bit positions in the two soft-bit sequences.

In some embodiments, the receiver apparatus comprises pre-decoding de-interleaver logic configured to de-interleave the first plurality of subcarrier-symbols according to a predetermined subcarrier-symbol de-interleave function to obtain the first plurality of subcarrier-symbols in a non-interleaved state prior to decoding by the soft-output decoder logic, and wherein the soft-output decoder is configured to generate the first output comprising the first soft-bit sequence in a non-interleaved state. Therefore, rather than performing bit de-interleaving for the first soft-bit sequence, subcarrier-symbol de-interleaving can be performed to de-interleave the first plurality of subcarrier-symbols prior to being input to the soft-output decoder logic. In this way, the first plurality of subcarrier-symbols are de-interleaved (re-ordered according to the predetermined subcarrier-symbol de-interleave function) to obtain the first plurality of subcarrier-symbols in a non-interleaved state, and the soft-output decoder logic thus decodes the first plurality of subcarrier-symbols in the non-interleaved state and generates the first output comprising the first soft-bit sequence in the non-interleaved state. This pre-decoding de-interleaving may comprise reordering frequency-domain sample data for the plurality of subcarriers so as to reorder the subcarriers of one of the first and second OFDM symbols relative to an order of the subcarriers of the other OFDM symbol.

In some embodiments the combiner logic is configured to combine the first soft-bit sequence and the second-bit sequence when both are in the non-interleaved state to obtain the combined soft-bit sequence.

In some embodiments, the receiver apparatus comprises interleaver logic configured to interleave the second soft-bit sequence generated by the soft-output decoder logic according to the predetermined interleave function to obtain the second soft-bit sequence in an interleaved state. Rather than performing bit de-interleaving on the first soft-bit sequence, or performing pre-decoding subcarrier-symbol de-interleaving on the first plurality of subcarrier-symbols, the receiver apparatus may comprise interleaver logic for interleaving the second soft-bit sequence according to the predetermined interleave function to thereby provide the second soft-bit sequence in the interleaved state. Therefore, both the first soft-bit sequence and the second soft-bit sequence can be obtained in the same interleaved state prior to being combined in the combiner logic. This enables the combiner logic then to efficiently combine the sequences.

The predetermined interleave function may be any bit-interleaving function. It may be such that every bit has a different position when in the interleaved state compared with the non-interleaved state, although this is not essential. It may move individual bits or it may move only groups (e.g. pairs or quartets) of bits. It may be an interleaving function specified in an IEEE 802.11 standard, e.g. in the 802.11ax standard.

The transmitted bit sequence may contain at least two bits, or at least five, ten or fifty bits. It may contain a mix of zeros and ones. It may be or include a predefined constant sequence (i.e. being the same across multiple OFDM signals), or it may be or include variable data (i.e. which may differ between a first and a second such OFDM signal). In some embodiments, the transmitted bit sequence is a sequence of exactly fifty-two bits. It may equal the full number of data-bearing subcarriers (e.g. populated subcarriers, ignoring any DC and sideband subcarriers) in a channel or in a resource unit (RU) containing the OFDM signal (e.g. an 802.11ax channel or RU).

The OFDM signal may be modulated using subcarrier-symbols that each encode one bit, or two bits, or three bits, or four bits, or any other number of bits. In particular, in some embodiments, each subcarrier-symbol encodes one bit.

In some embodiments, the receiver apparatus comprises pre-decoding subcarrier-symbol interleaver logic configured to interleave the second plurality of subcarrier-symbols according to the predetermined interleave function (also referred to herein as a subcarrier-symbol interleave function, when it is applied prior to decoding) to obtain the second plurality of subcarrier-symbols in an interleaved state prior to decoding by the soft-output decoder logic, and the soft-output decoder logic is configured to generate the second output comprising the second soft-bit sequence in an interleaved state. Therefore, rather than performing bit interleaving for the second soft-bit sequence, pre-decoding subcarrier-symbol interleaving can be performed to interleave the second plurality of subcarrier-symbols prior to being input to the soft-output decoder logic. In this way, the second plurality of subcarrier-symbols are interleaved (re-ordered according to the predetermined subcarrier-symbol interleave function) to obtain the second plurality of subcarrier-symbols in the interleaved state, and the soft-output decoder logic thus decodes the second plurality of subcarrier-symbols in the interleaved state and generates the second output comprising the second soft-bit sequence in the interleaved state.

In some embodiments the combiner logic is configured to combine the first soft-bit sequence in the interleaved state and the second soft-bit sequence when both are in the interleaved state to obtain the combined soft-bit sequence in the interleaved state.

In some embodiments (e.g. that do not use Viterbi decoding), it may be possible for the combined soft-bit sequence to be input to the hard-output decoder logic in the interleaved state and for the hard-output decoder logic to decode the combined soft-bit sequence in the interleaved state and thereby output the hard-bit sequence in the interleaved state. The receiver apparatus may then therefore further comprise de-interleaver logic configured to de-interleave the hard-bit sequence in the interleaved state according to the predetermined de-interleave function to thereby output the hard-bit sequence in a non-interleaved state.

However, in other embodiments, the combined soft-bit sequence in the interleaved state is firstly de-interleaved according to the predetermined de-interleave function before being input to the hard-output decoder logic. Hence in some embodiments, the receiver apparatus comprises de-interleaver logic configured to de-interleave the combined soft-bit sequence in the interleaved state to obtain the combined soft-bit sequence in a non-interleaved state prior to the generation of the hard-bit sequence by the hard-output decoder logic.

The transmitted bit sequence (redundantly encoded as the first bit sequence and the second bit sequence) may in some cases be a bit sequence that has been obtained by convolutional encoding. For example, a bit sequence included in the HE-SIG-A field may be encoded using a convolutional encoder to obtain the above mentioned second bit sequence, and then interleaving is performed on the second bit sequence to obtain the first bit sequence. Hence more generally, in some embodiments the transmitted bit sequence is convolutionally encoded, and the combined soft-bit sequence in the interleaved state is de-interleaved prior to being input to the hard-output decoder logic so that convolutional decoding can be performed to obtain the hard-bit sequence.

In some embodiments, the hard-output decoder logic comprises convolutional decoder logic configured to output the hard-bit sequence. In cases for which the transmitted bit sequence is convolutionally encoded, the hard-output decoder logic may comprise convolutional decoder logic for executing one or more convolutional decoder algorithms. Hence, the combined-soft bit sequence in the non-interleaved state can be convolutionally decoded to output the hard-bit sequence, in which the hard-bit sequence represents a convolutional decoding result (or, in other words, a convolutionally decoded output) for the transmitted bit sequence. In some embodiments, the convolutional decoder logic comprises a Viterbi decoder for executing a Viterbi decoder algorithm. The hard-output decoder logic decoder logic may be or comprise a soft Viterbi decoder. The combined soft-bit sequence (e.g. comprising 104 soft bits) may be input to the hard-output decoder logic which may output the hard-bit sequence (e.g. comprising 54 hard bits) representing the transmitted bit sequence.

In some embodiments, the soft-output decoder logic is configured to generate the first soft-bit sequence to include a respective log-likelihood ratio for each bit of the first bit sequence and to generate the second soft-bit sequence to include a respective log-likelihood ratio for each bit of the second bit sequence. The soft-output decoder logic may comprise a soft-output MIMO (Multiple Input Multiple Output) decoder. The MIMO may, in some embodiments, be a 1×1 MIMO—i.e. it may have a de-mapper configured for 1×1 operation. The use of soft-output MIMO decoder logic to obtain the first and second soft-bit sequences and the combiner logic to combine the two soft-bit sequences may provide improved bit error rate performance compared to, for example, a receiver apparatus using a hard-output MIMO decoder to hard-decode either the first plurality of subcarrier-symbols or the second plurality of subcarrier-symbols.

In some embodiments, for each respective log-likelihood ratio in the first soft-bit sequence, the combiner logic is configured to combine a respective log-likelihood ratio (LLR) having a bit position in the first soft-bit sequence with a respective log-likelihood ratio having a same bit position in the second soft-bit sequence to thereby obtain the combined soft-bit sequence. The combiner logic may sum two LLR values having a same bit position such that the combined soft-bit sequence comprises a sequence of respective combined LLRs. Optionally, the combiner logic may use a saturation condition. According to the saturation condition, the combiner logic assigns a saturation value to a respective combined LLR when a sum of two LLRs exceeds the saturation value.

In some embodiments, the transmitted bit sequence corresponds to a portion of a HE-SIG-A field in an 802.11ax High Efficiency Extended Range (HE-ER) frame. This may be an HE-ER-SU frame, according to a current or future version of the 802.11ax standard, or a different type of extended-range frame, such as a High Efficiency Extended Range Multi User (HE-ER-MU) frame according to a future version of the 802.11ax standard. The receiving circuitry may receive an OFDM radio-frequency signal (e.g. as a radio signal or as an electrical signal) for which the first and second plurality of subcarrier-symbols encode a bit sequence corresponding to a portion of the HE-SIG-A field. The receiver apparatus in accordance with the invention may be operable to generate the first and second soft-bit sequences as discussed above, combine the first and second soft-bit sequences, and output the hard-bit sequence representing a decoding result for the bit sequence corresponding to the portion of the HE-SIG-A field. Hence, a receiver apparatus in accordance with the invention may provide improved decoding of the HE-SIG-A field of an HE-ER frame format.

In some embodiments, the subcarriers of the first OFDM symbol are modulated using binary phase shift keying (BPSK) and the subcarriers of the second OFDM symbol are modulated using quadrature binary phase shift keying (QBPSK), wherein the subcarriers of the second OFDM symbol are ninety degrees out of phase with respect to those of the first OFDM symbol, and wherein the receiver apparatus further comprises rotation logic configured to apply a ninety degree phase adjustment to the subcarriers of the second OFDM symbol so that the first and second OFDM symbols are in phase prior to decoding by the soft-output decoder logic.

Some embodiments further include the possibility of the OFDM radio-frequency signal comprising a third OFDM symbol and a fourth OFDM symbol that redundantly encode another bit sequence with frequency and time diversity. Hence in some embodiments, the receiving circuitry is configured to receive the OFDM radio-frequency signal, in which the OFDM radio-frequency signal further comprises a third OFDM symbol comprising a third plurality of subcarrier-symbols, modulated on a corresponding plurality of respective subcarriers (which may be the same subcarriers as for the first and second OFDM symbols), and a fourth OFDM symbol comprising a fourth plurality of subcarrier-symbols, modulated on this corresponding plurality of respective subcarriers, wherein the third plurality of subcarrier-symbols encodes a second transmitted bit sequence as a third bit sequence and the fourth plurality of subcarrier-symbols encodes the second transmitted bit sequence as a fourth bit sequence, the third bit sequence being an interleaved version of the fourth bit sequence according to the predetermined interleave function. The soft-output decoder logic may be further configured to: generate a third output comprising a third soft-bit sequence for the third plurality of subcarrier-symbols; and generate a fourth output comprising a fourth soft-bit sequence for the fourth plurality of subcarrier-symbols. The combiner logic may be further configured to combine the third soft-bit sequence and the fourth soft-bit sequence with the third soft-bit sequence and the fourth soft-bit sequence either both in an interleaved state or both in a non-interleaved state to obtain a second combined soft-bit sequence, wherein the combiner logic is configured to combine a respective soft-bit having a bit position in the third soft-bit sequence with a respective soft-bit having a same bit position in the fourth soft-bit sequence. The hard-output decoder logic may be configured to output, in dependence upon the second combined soft-bit sequence, a second hard-bit sequence representing the second transmitted bit sequence.

In some embodiments the transmitted bit sequence may be a bit sequence that has been obtained by convolutional encoding. In some embodiments, the transmitted bit sequence (redundantly encoded by the first subcarrier-symbols and the second subcarrier-symbols) and second transmitted bit sequence (redundantly encoded by the third subcarrier-symbols and the fourth subcarrier-symbols) may correspond to a first portion (e.g. first half) and a second portion (e.g. second half) of a convolutional code, respectively. For example, a primary bit sequence (e.g. the HE-SIG-A field in the HE-ER-SU frame) may be convolutionally encoded to obtain a convolutional encoding, and the convolutional encoding may then be divided into such first and second portions. The first portion may be encoded by the first subcarrier-symbols (interleaved version) and the second subcarrier-symbols (non-interleaved version). The second portion may be encoded by the third subcarrier-symbols (interleaved version) and the fourth subcarrier-symbols (non-interleaved version).

Hence, in some embodiments, the transmitted bit sequence corresponds to a first portion of convolutionally encoded data and the second transmitted bit sequence corresponds to a second (e.g. remaining) portion of the convolutionally encoded data. The hard-output decoder logic may comprise convolutional decoder logic configured to output a hard-bit sequence representing a convolutional decoding of the data. The hard-output decoder logic may be configured to receive and process the combined soft-bit sequence in the non-interleaved state and the second combined soft-bit sequence in the non-interleaved state.

Therefore, receiver apparatus in accordance with the invention may be operable to recover (i.e. obtain a decoding result for) a primary bit sequence that has been convolutionally encoded and transmitted by transmitting a first portion (e.g. first half), using the first and second OFDM symbols, and transmitting a second portion (e.g. second half), using the third and fourth OFDM symbols. The combined soft-bit sequence and second combined soft-bit sequence may be obtained so as to both be in a non-interleaved state and both input to the hard-output decoder logic for convolutional decoding to thereby obtain a hard-bit sequence representing the primary bit sequence.

In some embodiments, the transmitted bit sequence corresponds to one half of the HE-SIG-A field in a High Efficiency Extended Range Single User (HE-ER-SU) frame, and the second transmitted bit sequence corresponds to another half of the HE-SIG-A field in the High Efficiency Extended Range Single User (HE-ER-SU) frame. Therefore, the receiver apparatus in accordance with some embodiments can therefore output a hard-bit sequence representing at least one half of the bit sequence included in the HE-SIG-A field, and in accordance with some embodiments can output the hard-bit sequence representing the entirety of the bits included in the HE-Sig-A field (i.e. a hard-bit sequence comprising a respective hard-bit for each of the 52 bits of the HE-SIG-A field).

In some embodiments, the subcarriers of the first OFDM symbol, the third OFDM symbol and the fourth OFDM symbol are each modulated using binary phase shift keying (BPSK), and subcarriers of the second OFDM symbol are modulated using quadrature binary phase shift keying (QBPSK). The subcarriers of the first, third and fourth OFDM symbols may have a same phase. The subcarriers of the second OFDM symbol may be ninety degrees out of phase with respect to the subcarriers of the first OFDM symbol. The receiver apparatus may further comprise rotation logic configured to apply a ninety degree phase adjustment to the subcarriers of the second OFDM symbol so that they are in phase with the subcarriers of the first OFDM symbol (and optionally with those of the third and the fourth OFDM symbols) prior to processing by the soft-output decoder logic.

The receiver apparatus may comprise one or more processors. It may comprise memory storing software as disclosed herein for execution by the one or more processors. The soft-output decoder logic may be provided by soft-output decoder circuitry (i.e. in hardware) or by soft-output decoder software, or by a combination of hardware and software. Similarly, the combiner logic may be provided by combiner circuitry (i.e. in hardware) or by combiner software, or by a combination of hardware and software. Also, the hard-output decoder logic may be provided by hard-output decoder circuitry (i.e. in hardware) or by hard-output decoder software, or by a combination of hardware and software.

In some embodiments, the receiver apparatus is an integrated circuit. It may be a radio-on-a-chip. However, in other embodiments it may be or form part of any type of electrical device. It may comprise one or more integrated circuit and/or circuitry formed of discrete electrical components.

In some embodiments, the receiver apparatus may comprise an electrical interface for receiving the OFDM radio-frequency signal as an electrical signal—e.g. from an off-chip antenna. In another set of embodiments, the receiver apparatus may comprise an antenna for receiving the OFDM radio-frequency signal as a radio signal.

According to another aspect of the present invention there is provided a system comprising the receiver apparatus according to any of the configurations above, and a transmitter apparatus configured to transmit the OFDM radio-frequency signal to the receiver apparatus as a radio signal.

Although the use of interleaving as disclosed herein can provide desirable additional frequency diversity, the applicant has realised that it is possible to benefit from time diversity even without using interleaving, and thereby still obtain improved decoding accuracy.

Thus, from a further aspect, there is provided a receiver apparatus comprising:
  receiving circuitry configured to receive an OFDM radio-frequency (RF) signal encoding a transmitted bit sequence, the OFDM radio-frequency signal comprising a first OFDM symbol comprising a first plurality of subcarrier-symbols, modulated on a corresponding plurality of respective subcarriers, and a second OFDM symbol comprising a second plurality of subcarrier-symbols, modulated on the corresponding plurality of respective subcarriers, wherein the first plurality of subcarrier-symbols and the second plurality of subcarrier-symbols both encode the transmitted bit sequence;
  soft-output decoder logic configured to: generate a first output comprising a first soft-bit sequence for the first plurality of subcarrier-symbols; and generate a second output comprising a second soft-bit sequence for the second plurality of subcarrier-symbols;
  combiner logic configured to combine the first soft-bit sequence and the second soft-bit sequence by combining a respective soft-bit having a bit position in the first soft-bit sequence with a respective soft-bit having a same bit position in the second soft-bit sequence; and
  hard-output decoder logic configured to output, in dependence upon the combined soft-bit sequence, a hard-bit sequence representing the transmitted bit sequence.

This aspect extends to a method comprising:
  receiving an OFDM radio-frequency signal encoding a transmitted bit sequence, the OFDM radio-frequency signal comprising a first OFDM symbol comprising a first plurality of subcarrier-symbols, modulated on a corresponding plurality of respective subcarriers, and a second OFDM symbol comprising a second plurality of subcarrier-symbols, modulated on the corresponding plurality of respective subcarriers, wherein the first plurality of subcarrier-symbols and the second plurality of subcarrier-symbols both encode the transmitted bit sequence;
  determining a first soft-bit sequence for the first plurality of subcarrier-symbols;
  determining a second soft-bit sequence for the second plurality of subcarrier-symbols;
  combining the first soft-bit sequence and the second soft-bit sequence by combining a respective soft-bit having a bit position in the first soft-bit sequence with a respective soft-bit having a same bit position in the second soft-bit sequence; and
  generating, in dependence upon the combined soft-bit sequence, a hard-bit sequence representing the transmitted bit sequence.

This aspect further extends to computer software (and to a non-transitory machine-readable medium storing the same) which, when executed by a receiver apparatus, causes the receiver apparatus to:
  process data representative of a received OFDM radio signal encoding a transmitted bit sequence, the OFDM radio signal comprising a first OFDM symbol comprising a first plurality of subcarrier-symbols, modulated on a corresponding plurality of respective subcarriers, and a second OFDM symbol comprising a second plurality of subcarrier-symbols, modulated on the corresponding plurality of respective subcarriers, wherein the first plurality of subcarrier-symbols and the second plurality of subcarrier-symbols both encode the transmitted bit sequence;
  determine a first soft-bit sequence for the first plurality of subcarrier-symbols;
  determine a second soft-bit sequence for the second plurality of subcarrier-symbols;
  combine the first soft-bit sequence and the second soft-bit sequence by combining a respective soft-bit having a bit position in the first soft-bit sequence with a respective soft-bit having a same bit position in the second soft-bit sequence; and
  generate, in dependence upon the combined soft-bit sequence, a hard-bit sequence representing the transmitted bit sequence.

In this way, the same bit sequence may be transmitted by two identical OFDM symbols, but in different symbol periods, and soft-bit values from each OFDM symbol may be combined before being hard-decoded. This can result in a reduced bit error rate compared with decoding only one of the two ODFM symbols. In some embodiments, the soft-bit values are log-likelihood ratio (LLR) estimates, and combining first and second soft-bits may comprise adding the soft-bits. In some such embodiments, the transmitted bit sequence corresponds to an L-SIG field in a High Efficiency (HE) PPDU, e.g. an HE-ER-SU frame. The first OFDM symbol may encode the L-SIG field on 48 subcarriers, and the second OFDM symbol may encode the repeated L-SIG field (referred to as the RL-SIG) identically on the same 48 subcarriers, i.e. without any interleaving.

Some embodiments may be configured to support both the preceding interleaved aspect (providing both time and frequency diversity) and this non-interleaved aspect (providing only time diversity). They may be configured to combine a pair of soft-bit sequences without de-interleaving, determined from a first part of the an ODFM signal (e.g. the L-SIG & RL-SIG fields of an HE PPDU), and also be configured to combine a pair of soft-bit sequences with de-interleaving, determined from a second part of the same or a different ODFM signal (e.g. the HE-SIG-A field of an HE-ER-SU PPDU).

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain embodiments of the present invention will now be described, by way of example only, and with reference to the accompanying drawings, in which.

DETAILED DESCRIPTION

In the following description, a number of specific details are presented in order to provide a thorough understanding of the aspects of the present disclosure. It will be apparent, however, to a person skilled in the art that these specific details need not be employed to practice the techniques of the present disclosure. Conversely, specific details known to the person skilled in the art are omitted for the purposes of clarity where appropriate.

Figure 1:
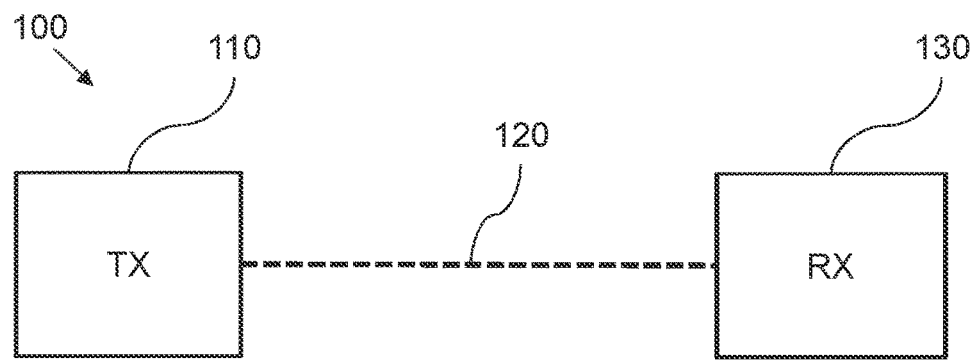
FIG. 1 is a schematic diagram illustrating an example of a radio communication system in accordance with embodiments of the present invention.

FIG. 1 schematically illustrates an example of a radio communication system 100 comprising a transmitter apparatus (TX) 110 and a receiver apparatus (RX) 130 operable to communicate via a radio link 120. In the example shown, there is a single transmitter apparatus 110 and a single receiver apparatus 130 however it will be understood that the system 100 may comprise any suitable number of devices and in some examples the receiver apparatus 130 may receive radio signals from a plurality of transmitter apparatuses and/or the transmitter apparatus 110 may transmit radio signals to a plurality of receiver apparatuses. For example, the receiver apparatus 130 may be a first WLAN mobile station (STA) (e.g. a laptop computer) and the transmitter apparatus 110 may be a WLAN access point (AP) or a second mobile station (STA). More generally, the receiver apparatus 130 is operable to receive radio signals from the transmitter apparatus 110 via the radio link 120. The radio communication system 100 represent an example system that can be used to implement the techniques of the present disclosure. The receiver apparatus 130 may be a receiver apparatus 500 as described in greater detail below.

Generally, the transmitter apparatus 110 comprises: a modulator such as a frequency modulator, amplitude modulator or phase modulator operable to modulate a signal having a radio-frequency carrier frequency with data corresponding to a bitstream; amplifier circuitry operable to amplify the modulated signal; and transmission circuitry (e.g. one or more transmit antennas) operable to transmits the amplified signal as a radio signal.

Orthogonal Frequency Division Multiplexing (OFDM) is a form of radio transmission that is used in various radio protocols such as Long Term Evolution (LTE™), various IEEE™ 802.11 standards, DAB™ radio, DVB-T, and WiMAX™. Rather than encoding data on a single carrier frequency, a data stream is spread over some or all of a radio channel containing multiple subcarriers. The modulated subcarriers are typically closely spaced across the frequency spectrum, although this is not essential. The modulated subcarriers are orthogonal to avoid mutual interference. Therefore, the introduction of frequency domain diversity means that OFDM techniques can provide good resilience to multipath fading and to external interference and are thus often used for digital radio communication.

Examples of suitable modulation techniques which may be used for such OFDM subcarrier modulation in some embodiments of the invention include: Phase Shift Keying (PSK); Binary Phase Shift Keying (BPSK), Quaternary Binary Phase Shift Keying (QBPSK); Differential Phase Shift Keying (DPSK); and Quadrature Amplitude Modulation (QAM), such as 16 QAM. At least in some embodiments, the transmitter apparatus 110 is operable to transmit a radio signal comprising a plurality of subcarriers modulated using any of the modulation techniques above. The signal can comprise a succession of OFDM symbols, transmitted in successive symbol periods. Each OFDM symbol comprises a plurality of subcarrier-symbols modulated on a corresponding plurality of respective subcarrier frequencies and all transmitted in the same symbol period (i.e. simultaneously).

Figure 2:
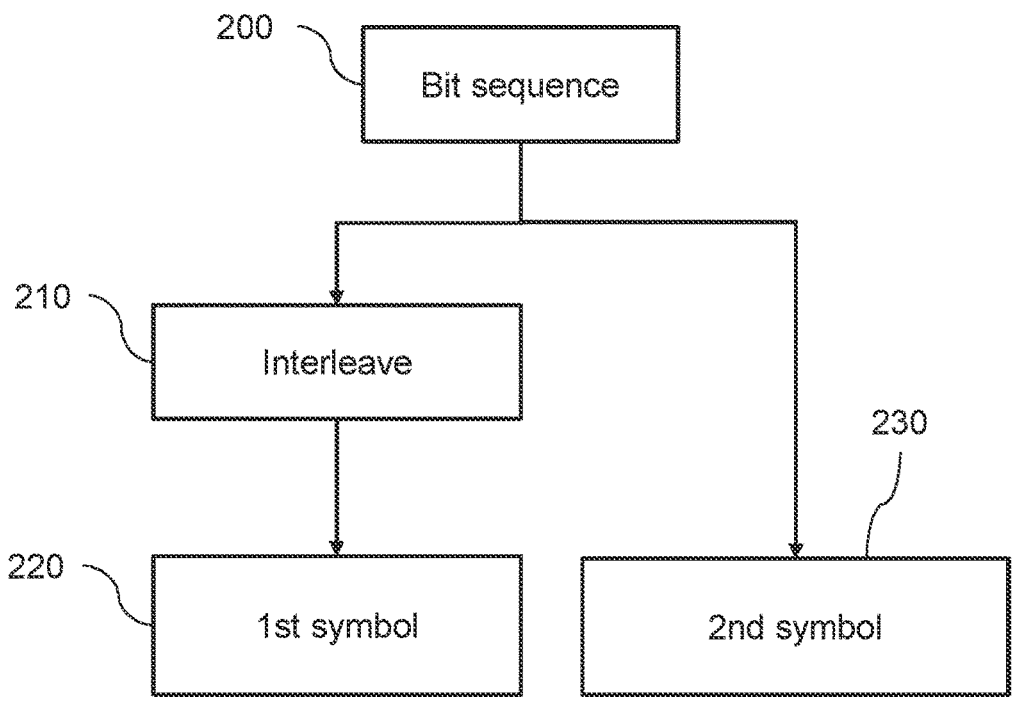
FIG. 2 is a schematic flowchart illustrating an example of an OFDM radio transmission scheme for encoding a bit sequence.

FIG. 2 schematically illustrates an example of an OFDM radio transmission scheme for redundantly encoding a transmitted bit sequence 200 of N bits onto an OFDM radio signal. The transmitter apparatus 110 may implement such a scheme. In FIG. 2, the original bit sequence to be transmitted 200 is interleaved 210 then processed to obtain a first set of subcarrier-symbols that are encoded onto a first OFDM symbol 220 of the OFDM radio signal. The original bit sequence 200 (in a non-interleaved state) is also processed to obtain a second set of subcarrier-symbols that are encoded onto a second (e.g. later) OFDM symbol 230 of the OFDM radio signal. Therefore, a same bit of the bit sequence 200 is redundantly encoded, such that both frequency diversity and time diversity are achieved for each bit of the bit sequence.

Depending on what type of modulation scheme is used, the number of respective bits encoded per subcarrier-symbol can vary. For example, BPSK modulation may be used for one or both of the first OFDM symbol and the second OFDM symbol such that a respective subcarrier-symbol encodes a single respective bit value. Hence, when the original bit sequence has a length of N bits, an OFDM symbol, modulated using BPSK, comprises N subcarrier-symbols modulated on N subcarriers, each encoding a bit of the original bit sequence. Moreover, for the case in which the first and second OFDM symbols are each modulated using BPSK, the first OFDM symbol comprises N first subcarrier-symbols each encoding a bit of the original bit sequence and the second OFDM symbol comprises N second subcarrier-symbols each encoding a bit of the original bit sequence. The first OFDM symbol is transmitted on the same subcarriers as the second OFDM symbol but the N first subcarrier-symbols encode the original bit sequence in an interleaved state.

When using binary modulation, this has the effect of reordering the mapping of bits to respective subcarriers.

As shown on the left side of FIG. 2, the original bit sequence 200 to be transmitted is firstly bit interleaved 210 to re-order each bit of the original bit sequence and then encoded onto the subcarriers in a first OFDM symbol period 220. As shown on the right side of FIG. 2, the original bit sequence 200 (without being interleaved and thus in a non-interleaved state) is modulated onto the same subcarriers in a second OFDM symbol period 230. The bit-interleaving operation is performed on the original sequence of bits according to a predetermined interleave function to obtain the bit-interleaved version of the original sequence of bits. To achieve this, the original sequence of bits can be processed by interleaver logic (e.g. using interleaving software, or using interleaver circuitry when implemented in hardware) to modify the ordering of the bits. The interleaver logic (e.g. interleaver circuitry) may use any suitable interleave function (e.g. interleave pattern) to permute the ordering of the bits.

The receiver apparatus 130 may use a corresponding de-interleave function to reverse the interleave function to recover the original ordering of the sequence of bits.

The original sequence of bits 200 (also referred to as a primary sequence of bits) as shown in FIG. 2 may correspond to some or all of any suitable bit-stream to be transmitted. In some cases, the original sequence of bits 200 as shown in FIG. 2 may correspond to at least a portion (or an entirety) of a data field of a packet to be transmitted.

Optionally, a bit sequence from a portion of a data field of a packet may firstly be subjected to a convolutional encoding (using one or more convolutional encoders at a transmitter side) and then used as the original bit sequence 200 in the scheme as shown in FIG. 2. Hence more generally, in some cases the OFDM radio signal may redundantly encode a transmitted bit sequence that is convolutionally encoded, and at the receiver side the transmitted bit sequence may firstly be recovered and then input to convolutional decoder logic, e.g. for recovering a portion of a data field of a packet.

Still referring to FIG. 2, the type of modulation may be the same for the first OFDM symbol 220 and the second OFDM symbol 230, or the type of modulation may be different. For example, both the first OFDM symbol 220 and the second OFDM symbol 230 may be modulated using Binary Phase Shift Keying (BPSK). Alternatively, a first type of modulation may be used for the first OFDM symbol 220 and a second type of modulation different from the first type of modulation may be used for the second OFDM symbol 230.

In accordance with the OFDM radio transmission scheme shown in FIG. 2, frequency domain diversity is provided due to the use of an interleaved version of the original bit sequence and a non-interleaved version of the original bit sequence, which causes a bit of the original bit sequence 200 to be transmitted on a different respective sub-carrier frequency in each of the two OFDM symbols 220, 230. Time diversity is provided by transmitting the same bit sequence twice, in two different OFDM symbol periods. For example, in the case where each subcarrier-symbol encodes a single bit value, a given bit value of the original (non-interleaved) sequence may be encoded onto a first subcarrier of the first OFDM symbol 220 and transmitted during a first symbol interval, but the same given bit value of the original sequence will be located at a different bit position in the interleaved sequence and is thus encoded onto a subcarrier of the second OFDM symbol 230 that is transmitted at a different frequency to the first subcarrier. In this way, using the above OFDM radio transmission scheme, a same portion of the original bit sequence is transmitted with both time and frequency diversity.

Whilst FIG. 2 refers to a first OFDM symbol 220 and a second OFDM symbol 230, the second OFDM symbol 230 need not necessarily be transmitted after the first OFDM symbol 220, but could precede it. The terms first OFDM symbol and second OFDM symbol are used to distinguish between two different OFDM symbols that redundantly encode the same information where one of the OFDM symbols encodes an interleaved version and the other OFDM symbol encodes a non-interleaved version.

A receiver apparatus 130 can thus receive the OFDM radio signal and recover the sequence of bits from at least one of the first OFDM symbol and the second OFDM symbol. As explained in more detail later, a de-interleaving function can be used at the receiver side which may act on any of: the interleaved OFDM symbol (e.g. frequency-domain waveform samples over the OFDM symbol period); a soft-bit sequence output by a soft-decoder for the interleaved OFDM symbol; a combined soft-bit sequence obtained using the soft-bit sequence output for the interleaved OFDM symbol; or a hard-bit sequence obtained by either hard decoding the soft-bit sequence output for the interleaved OFDM symbol or hard decoding the combined soft-bit sequence. More generally, a de-interleaving function can be used at the receiver apparatus 130 to reverse the bit-interleaving function performed at the transmitter side. In particular, a bit-interleaving algorithm and corresponding bit de-interleaving algorithm may be used by the transmitter apparatus 110 and receiver apparatus 130, respectively.

Figure 3:
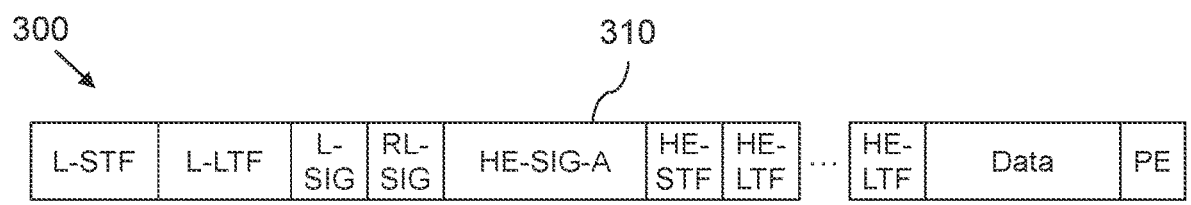
FIG. 3 is a schematic diagram illustrating a High Efficiency Extended Range Single User (HE-ER-SU) PPDU format.

FIG. 3 schematically illustrates a High Efficiency Extended Range Single User (HE-ER-SU) frame 300 as defined in the IEEE™ 802.11ax standard. The IEEE™ 802.11ax standard defines a number of High Efficiency (HE) frame formats, including the High Efficiency Extended Range Single User (HE-ER-SU) frame format. As shown in FIG. 3, the HE-ER-SU physical layer protocol data unit (PPDU) format includes the following fields: L-STF (legacy short training field), L-LTF (legacy long training field), L-SIG (legacy signal) field, RL-SIG (repeated legacy signal) field, HE-SIG-A (high-efficiency signal A) field 310, HE-STF (high-efficiency short training) field, HE-LTF (high-efficiency long training field), Data (payload data), and a PE (packet extension) field.

Transmission of the HE-SIG-A field 310 can be repeated in different OFDM symbols to provide extended range and/or improved performance for low signal to noise ratio environments.

Figure 4:
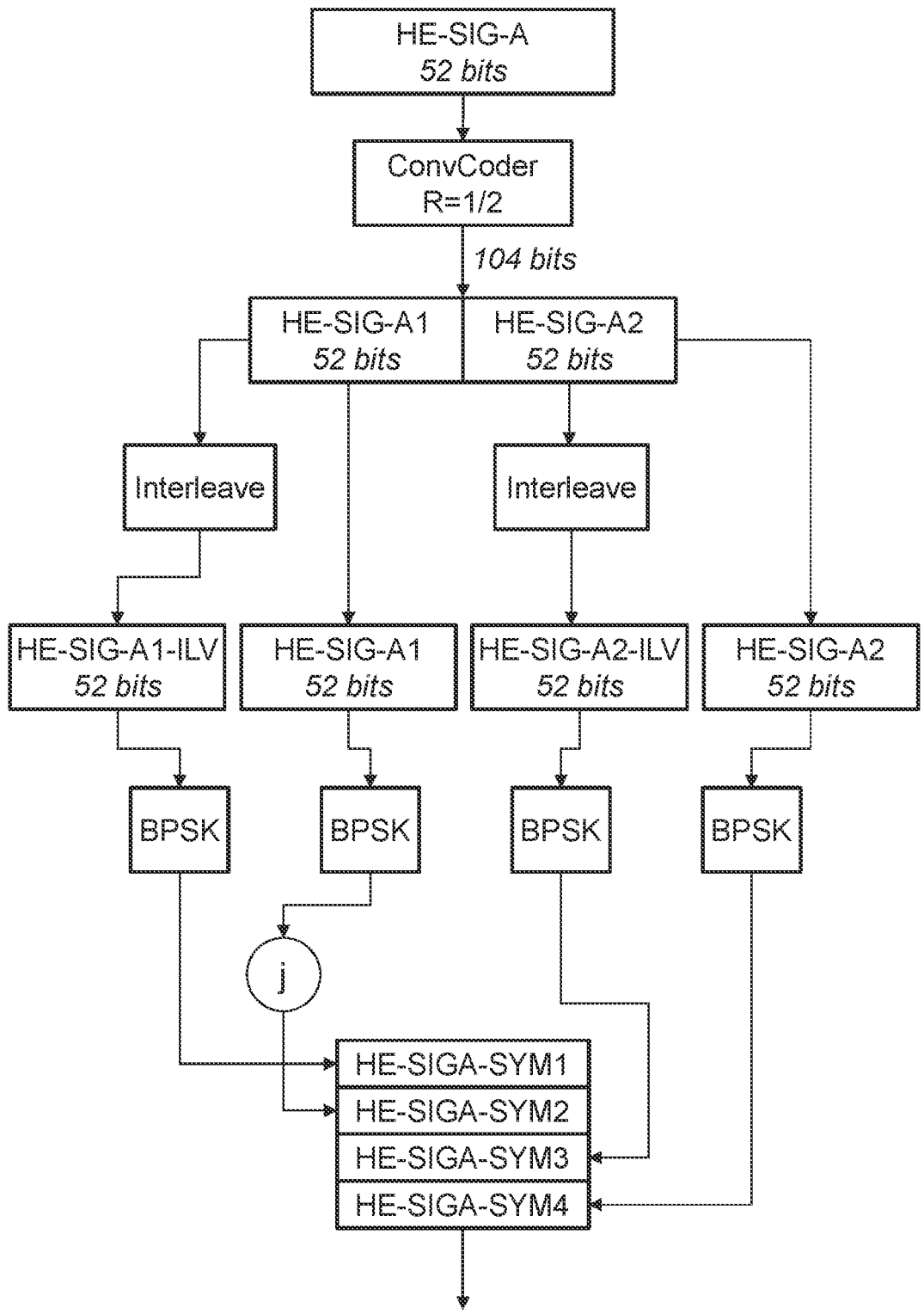
FIG. 4 is a schematic diagram illustrating an example of an OFDM radio transmission scheme for the HE-ER-SU PPDU format in which the HE-SIG-A field is redundantly encoded.

FIG. 4 schematically illustrates an example of an OFDM radio transmission scheme for encoding the HE-SIG-A field. The HE-SIG-A field consists of 52 bits including 6 tail bits. The 52 bits of the HE-SIG-A field are convolutionally encoded using a rate of $R=\frac{1}{2}$ to obtain 104 bits. The 104 bits are divided into two halves to obtain a first set of 52 bits (HE-SIG-A1) and a second set of 52 bits (HE-SIG-A2). In the example of FIG. 4, the convolutional encoder operates using a of $R=\frac{1}{2}$ convolutional coding rate such that two bits are produced per window, and the window (which may be of any suitable size) is shifted forward one bit at a time to thereby obtain the 104-bit convolutional code.

The first set of bits (HE-SIG-A1) is then interleaved to obtain an interleaved version (HE-SIG-A1-ILV) and the interleaved version is encoded onto a first OFDM symbol (HE-SIG-A-SYM1) of an OFDM radio signal using Binary Phase Shift Keying (BPSK) modulation. Consequently, the first OFDM symbol (HE-SIG-A-SYM1) of the OFDM signal comprises (i.e. is modulated with) a first plurality of subcarrier-symbols encoding the first set of bits (HE-SIG-A1-ILV) in an interleaved state. In addition, the same first set of bits (HE-SIG-A1) is also further encoded onto the same set of subcarriers but in a second OFDM symbol (HE-SIG-A-SYM2) of the OFDM radio signal, and in a non-interleaved state, using Quadrature Binary Phase Shift Keying (QBPSK) modulation. In the schematic diagram shown in FIG. 4, the QBPSK modulation process is shown as a BPSK modulation followed by a phase rotation process j to rotate the phase by 90 degrees. Consequently, the second OFDM symbol (HE-SIG-A-SYM2) of the OFDM signal comprises a second plurality of subcarrier-symbols that also encode the first set of bits (HE-SIG-A1) but on different frequencies.

The second set of bits (HE-SIG-A2) is interleaved to obtain an interleaved version (HE-SIG-A2-ILV) and the interleaved version is encoded onto a third OFDM symbol (HE-SIG-A-SYM3) of the OFDM radio signal using Binary Phase Shift Keying (BPSK) modulation. In addition, the second set of bits (HE-SIG-A2) is further encoded onto a fourth OFDM symbol (HE-SIG-A-SYM4) of the OFDM radio signal using Binary Phase Shift Keying (BPSK) modulation.

BPSK and QBPSK modulation transmit one bit per subcarrier-symbol. Accordingly, the first, second, third and fourth OFDM symbols each comprise a set of 52 subcarrier-symbols, each subcarrier-symbol being transmitted on a different respective subcarrier frequency of a set of 52 subcarrier frequencies. The first and second OFDM symbols encode an interleaved version and a non-interleaved version of the HE-SIG-A1 bits, and as such both time domain diversity and frequency domain diversity are achieved for the transmission of HE-SIG-A1. Similarly, the third and fourth OFDM symbols encode an interleaved version and a non-interleaved version of the HE-SIG-A2 bits, and as such both time domain diversity and frequency domain diversity are achieved for the transmission of HE-SIG-A2.

Hence more generally, a receiver apparatus 130, when tuned to a given radio channel for the OFDM radio signal, can receive the first, second, third and fourth OFDM symbols and decode the OFDM radio signal to obtain the bit sequence HE-SIG-A1 and/or the bit sequence HE-SIG-A2. It may also use convolutional decoding to obtain at least some of the bit sequence of the HE-SIG-A field.

Consequently, any one of the first OFDM symbol and the second OFDM symbol can be decoded at a receiver side so as to recover a transmitted bit sequence. In particular, decoding of just the second OFDM symbol that encodes the transmitted bit sequence in a non-interleaved state would not require a de-interleaving operation (or knowledge of a de-interleaving function) at the receiver side. Thus, in a naïve implementation the second OFDM symbol, encoding the transmitted bit sequence, could be hard decision decoded to obtain a hard output comprising binary values representing an estimate for the original bit sequence.

However, digital radio signals can often be subject to external factors that may cause uncertainty regarding whether a received bit was a digital "0" or "1". In particular, the applicants have realised that transient impairment to the quality of the channel can lead to poor bit error rate (BER) performance when using the above mentioned hard decision decoding for a single OFDM symbol period. Impairment of the quality of the channel can be particularly problematic for extended range applications, such as those involving the 802.11ax HE-ER-SU PPDU format. The applicants have identified that improved bit error rate performance can be achieved for an OFDM radio signal comprising first and second OFDM symbols as described above, and in particular that improved bit error rate performance can be achieved for OFDM transmission of the HE-ER-SU PPDU format.

Figure 5A:
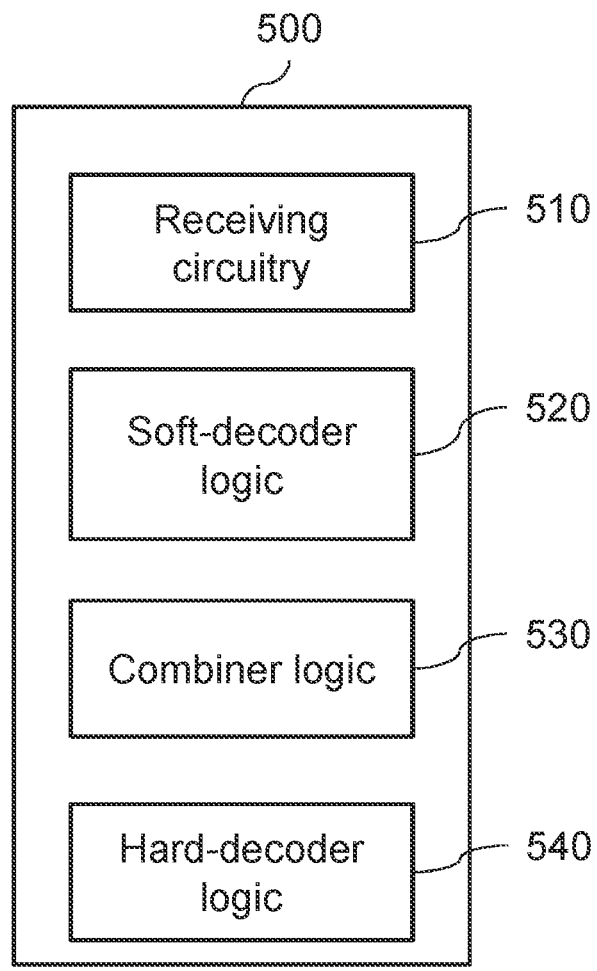
FIG. 5a is a schematic diagram illustrating a receiver apparatus in accordance with embodiments of the present invention.

FIG. 5a is a schematic diagram illustrating a receiver apparatus 500 in accordance with embodiments of the present invention—e.g. for use in a system 100 as described above. The receiver apparatus 500 comprises receiving circuitry 510, soft-output decoder logic 520, combiner logic 530, and hard-output decoder logic 540. The receiving circuitry 510 receives an OFDM radio-frequency (RF) signal according to the techniques discussed above with reference to FIG. 2 or FIG. 4 such that the received OFDM RF signal comprises at least the first OFDM symbol and the second OFDM symbol encoding a transmitted bit sequence as a first bit sequence and a second bit sequence, the first bit sequence being an interleaved version of the second bit sequence according to a predetermined interleave function. It may comprise an antenna and receive the RF signal as a radio signal, or it may receive it as an electrical signal. The receiving circuitry 510 may comprise any combination of conventional components such as amplifiers, filters, mixers, analog-to-digital converters (ADC), etc. It also includes a fast Fourier transform (FFT) engine for converting time-domain samples to the frequency domain.

The receiver apparatus 500 in accordance with the invention comprises the soft-output decoder logic 520 that generates a first output comprising a first soft-bit sequence for the first plurality of subcarrier-symbols of the first OFDM symbol and separately (i.e. independently) generates a second output comprising a second soft-bit sequence for the second plurality of subcarrier-symbols of the second OFDM symbol. The combiner logic 530 combines the first soft-bit sequence and the second soft-bit sequence to obtain a combined soft-bit sequence. Therefore, the first subcarrier-symbols and second subcarrier-symbols are separately soft-decoded so that two soft bit-sequences are independently generated and subsequently combined using soft-bit combining to obtain the combined bit sequence. The combiner logic 530 may combine the soft bits in any appropriate way; in some embodiments, it is configured to combine first and second soft-bit values by summing them. The combined bit sequence is then hard decoded by the hard-output decoder logic 540.

Any or all of the soft-output decoder logic 520, combiner logic 530 and hard-output decoder logic 540 may be provided by software executing on one or more processors of the receiver apparatus 500, or by hardware, or by a combination of software and hardware. In some embodiments, one or more of the logic modules 520, 530, 540 comprises respective application-specific digital logic; this may provide greater efficiency than a software-based implementation. However, in some embodiments, one or more of the logic modules 520, 530, 540 is implemented at least partly by software; this can provide the ability to update the logic, e.g. to support new radio protocols.

For the purposes of explanation, the following techniques will be discussed with reference to the 802.11ax HE-SIG-A field, however, it is to be understood that the techniques disclosed herein can be applied in relation to any other suitable bit sequence encoded that is redundantly encoded in time and optionally also frequency, e.g. using the principles of FIG. 2 or FIG. 4.

Figure 5B:
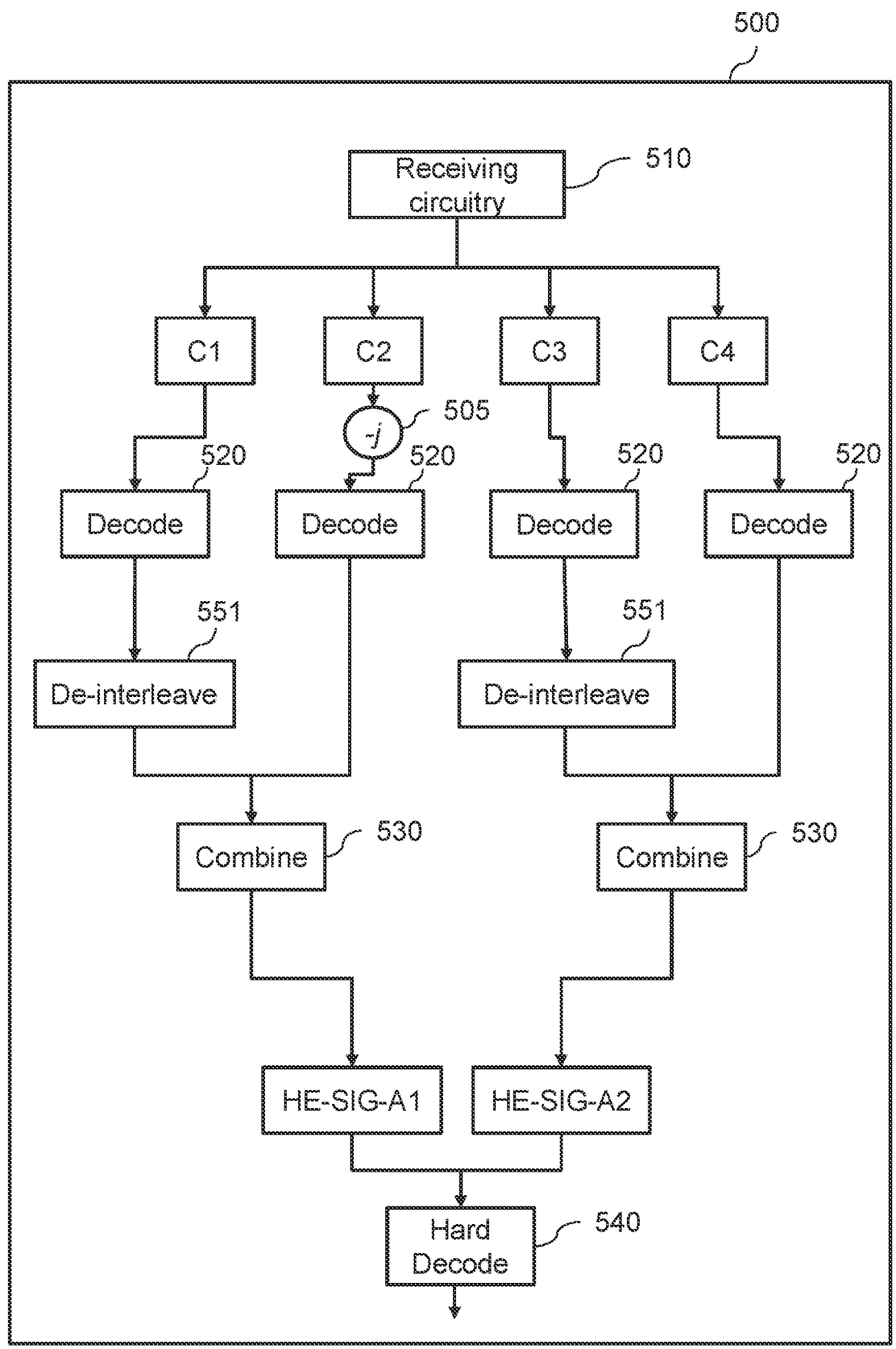
FIG. 5b is schematic diagram illustrating the receiver apparatus in accordance with some embodiments of the present invention.

FIG. 5b is a more detailed schematic diagram illustrating an example of the receiver apparatus 500 for processing an OFDM radio signal transmitting the bit sequence of the HE-SIG-A field. The receiver receiving circuitry 510 receives the OFDM radio signal comprising a first OFDM symbol signal C1, second OFDM symbol signal C2, third OFDM symbol signal C3 and fourth OFDM symbol signal C4. For ease of explanation the following description refers to processing of the first OFDM symbol signal C1 and the second OFDM symbol signal C2 in detail, but similar operations may similarly be performed with respect to the third OFDM symbol signal C3 and the fourth OFDM symbol signal C4.

In this example, the first OFDM symbol signal C1 encodes a first bit sequence being the 52-bit sequence HE-SIG-A1 and the second OFDM symbol signal C2 encodes a second bit sequence being the 52-bit sequence HE-SIG-A1-ILV. Alternatively, the first OFDM symbol signal C1 could encode a first bit sequence being the 52-bit sequence HE-SIG-A1-ILV and the second OFDM symbol signal C2 could encode a second bit sequence being the 52-bit sequence HE-SIG-A1. The first OFDM symbol signal C1 has been BPSK modulated whereas the second OFDM symbol signal C2 has been QBPSK modulated, and therefore rotation logic 505 (e.g. rotation circuitry), illustrated as a "1 in FIG. 5b, which may be provided as part of the receiving circuitry 510 or the soft-decoder logic 520, applies a phase rotation to the subcarriers of the second OFDM symbol signal C2 to adjust the phase by ninety degrees so that C1 and C2 are in phase.

The soft-decoder logic 520 soft-decodes the signals C1 and C2 to independently obtain two soft-bit sequences, namely a first OFDM symbol soft-bit sequence and a second OFDM symbol soft-bit sequence. The soft-bit values of each sequence may, in some embodiments, be log-likelihood ratio (LLR) estimates. As shown in FIG. 5b, the receiver apparatus 500 comprises de-interleaver logic 551 (embodying reordering logic as disclosed herein) for performing a bit de-interleaving function with respect to the first OFDM symbol soft-bit sequence to de-interleave the soft-bit sequence. Therefore, the de-interleaver logic 551 outputs the first OFDM symbol soft-bit sequence in a non-interleaved stated. In this example, the two soft bit sequences (the first OFDM symbol soft-bit sequence and the second OFDM symbol soft-bit sequence) are both in a non-interleaved state when input to the combiner logic 530. More generally, embodiments of the receiver apparatus 500 comprise one or more de-interleavers and/or one or more interleavers prior to the combiner logic 530 for ensuring that the two soft-bit sequences that are input to the combiner logic 530 are in a matching state (either both interleaved or both non-interleaved). FIGS. 6a-6d, discussed below, provide further details of other possibilities for interleaving and de-interleaving.

Still referring to FIG. 5b, the combiner logic 530 combines the first OFDM symbol soft-bit sequence and the second OFDM symbol soft-bit sequence. The first OFDM symbol soft-bit sequence and the second OFDM symbol soft-bit sequence each have 52-bits and are both in a non-interleaved state. Therefore, the combiner logic 530 performs a soft-bit combination operation to combine these two soft-bit sequences to obtain a combined soft-bit sequence of fifty-two combined soft-bits. In particular, the combiner logic 530 combines two respective soft-bits, namely a soft-bit of the first OFDM symbol soft-bit sequence and a soft-bit of the second OFDM symbol soft-bit sequence, having a same bit position, to obtain a respective combined soft-bit in the corresponding position in the combined sequence. Therefore, a 52-bit combined soft-bit sequence is output by the combiner logic 530, representing the 52-bit sequence HE-SIG-A1, and is input to the hard-output decoder logic 540. This hard-decodes each of the fifty-two combined soft-bits to obtain a 52-bit hard-bit sequence representing a recovered result (e.g. a maximum-likelihood estimate) representing the transmitted bit sequence.

FIG. 5b therefore schematically illustrates an embodiment in which a de-interleave function with respect to the first OFDM symbol soft-bit sequence is used so that the first OFDM symbol soft-bit sequence and the second OFDM symbol soft-bit sequence are both in matching states (both in the non-interleaved state in this example) at the input to the combiner logic 530. Whilst FIG. 5b shows an arrangement in which a de-interleave operation is performed for a soft-bit value sequence output by the soft-output decoder logic 520, other possibilities are also possible in accordance with embodiments of the present invention. Generally speaking, any suitable combination of interleave and/or de-interleave operations can be performed so as to obtain two soft-bit sequences that are either both in an interleaved state or both in a non-interleaved state at the input to the combiner logic 530.

FIGS. 6a-6d are schematic flowcharts illustrating four different possibilities for obtaining two soft-bit sequences that are in a matching state at the input to the combiner logic 530.

Figure 6A:
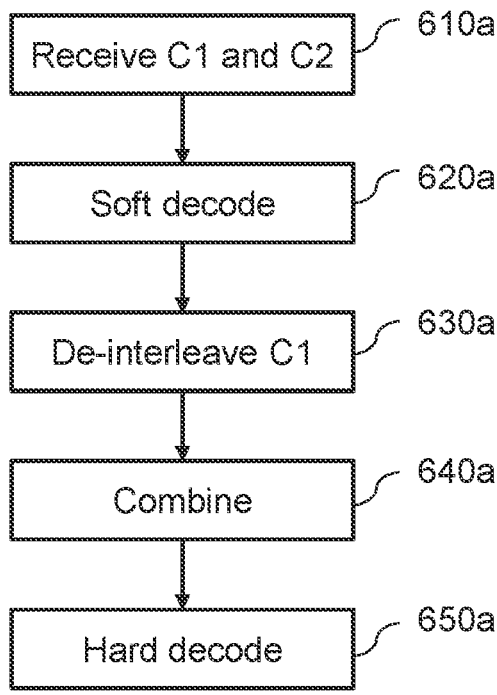
FIGS. 6a-6d are schematic flowcharts illustrating example methods of operation for a receiver apparatus in accordance with some embodiments of the present invention.

FIG. 6a is a schematic flow chart illustrating method operations performed by the receiver apparatus 500 of FIG. 5b. At a step 610a, the receiver apparatus receives the OFDM symbols C1 and C2. At a step 620a, the receiver apparatus soft-decodes the OFDM symbols C1 and C2 and generates the first OFDM symbol soft-bit sequence and the second OFDM symbol soft-bit sequence. At a step 630a, the receiver apparatus de-interleaves the first soft-bit sequence in accordance with a predetermined de-interleaving function. At a step 640a, the receiver apparatus combines the first soft-bit sequence and the second soft-bit sequence (e.g. using maximum-ratio, selective, or equal-gain combining) to obtain the combined soft-bit sequence. And, at the step 650a, the receiver apparatus hard decodes the combined soft-bit sequence to obtain a hard-bit sequence representing the recovered transmitted bit sequence.

Figure 6B:
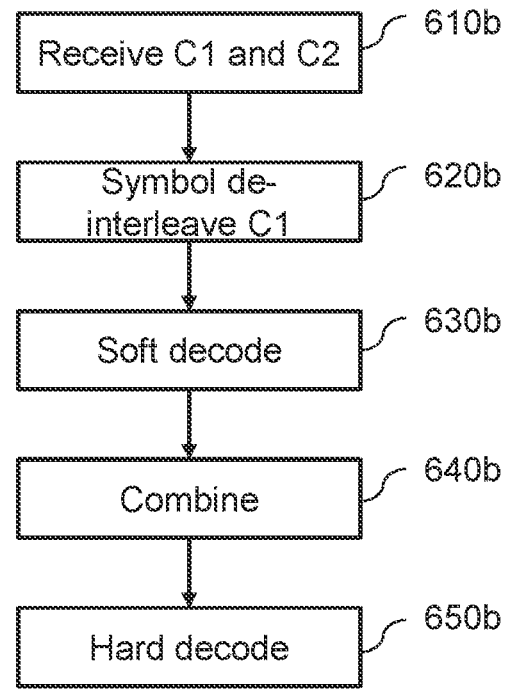
Figure 6C:
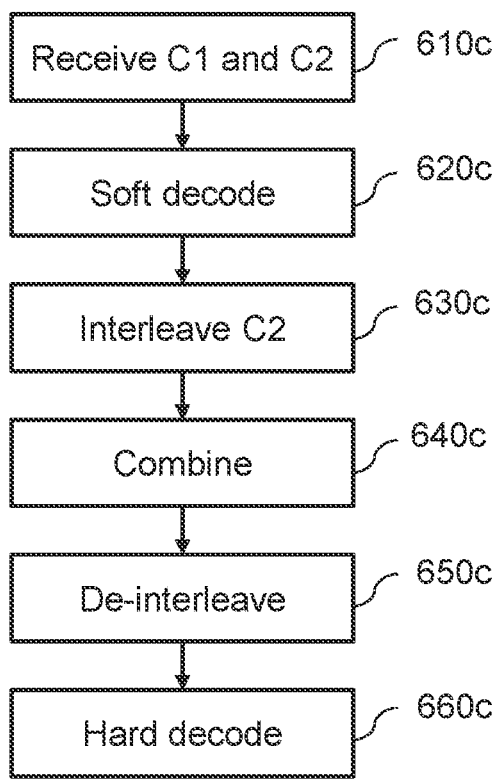
Figure 6D:
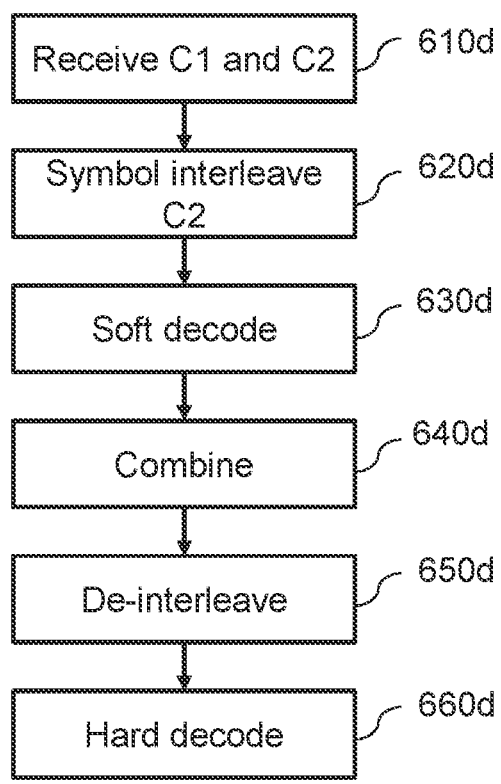

FIGS. 6b-6d are schematic flowcharts illustrating other different possibilities for de-interleaving and/or interleaving.

In particular, in one set of embodiments of the invention the receiver apparatus 500 comprises pre-decoding de-interleaver logic which is provided for performing a de-interleave function with respect to the sampled waveform of the first OFDM symbol signal C1 (converted to the frequency domain by a fast Fourier transform (FFT) operation), prior to being soft-decoded by the soft-decoder logic 520 (this is described below with reference to FIG. 6b). In another set of embodiments, the receiver apparatus 500 comprises interleaver logic which is provided for performing a bit interleaving function with respect to the second OFDM symbol soft-bit sequence to interleave the second soft-bit sequence so that both the first soft-bit sequence and the second soft-bit sequence are in an interleaved state at the input to the combined logic 530 (this is described below with reference to FIG. 6c). Furthermore, in a further set of embodiments of the invention the receiver apparatus 500 comprises pre-decoding interleaver logic which is provided for performing a pre-decoding interleaving function with respect to the sampled waveform of the second OFDM symbol signal C2 (converted to frequency domain by an FFT), prior to being input to the soft-decoder logic 520 (this is described below with reference to FIG. 6d).

FIG. 6b is another schematic flow chart illustrating method operations performed by the receiver apparatus 500 in accordance with some embodiments of the invention for which the first and second OFDM symbol are encoded (i.e. modulated) with a single bit per subcarrier (e.g. both encoded using BPSK, both encoded using QBPSK, or one being encoded using BPSK and the other being encoded using QBPSK), or for which multiple bits are encoded per subcarrier but the transmitter applies interleaving on bit tuples corresponding to the bit tuples of each subcarrier of the OFDM symbols (i.e. treating each bit tuples as a indivisible unit when applying reordering) (e.g. using a QAM modulation). The step 610b is the same as the step 610a. At a step 620b, the receiver apparatus de-interleaves signal samples (e.g. frequency-domain sample values, generated by applying a Fourier transform to the received signal) for each of the subcarriers of the first OFDM symbol C1 according to the predetermined de-interleave function so as to re-order the subcarriers of the first OFDM symbol. The predetermined subcarrier-symbol de-interleave function re-orders the first OFDM symbol samples in the frequency domain so that the reordered subcarrier symbols encode the non-interleaved version of the transmitted bit sequence. In this way, the soft-output decoder logic 520 can generate the soft-bit sequence based on the re-ordered first plurality of subcarrier symbols such that the generated soft-bit sequence is output in a non-interleaved state. Hence, at a step 630b the receiver apparatus soft-decodes the OFDM symbols C1 and C2 (which are both in a non-interleaved state) and outputs the first subcarrier soft-bit sequence and the second subcarrier soft-bit sequence. Steps 640b and 650b are the same as the steps 640a and 650a.

FIG. 6c is another schematic flow chart illustrating method operations performed by the receiver apparatus 500 in accordance with some embodiments of the invention. Steps 610c and 620c are the same as the step 610a and 620a. At a step 630c, the receiver apparatus interleaves the second OFDM symbol soft-bit sequence in accordance with a predetermined bit-interleaving function. It uses the same interleaving function as the transmitter apparatus 110 used to interleave the bits for transmission on the first OFDM symbol. At a step 640c, the receiver apparatus combines the first OFDM symbol soft-bit sequence and the second OFDM symbol soft-bit sequence (both being in a same interleaved state) to obtain the combined soft-bit sequence. At a step 650c, the receiver apparatus de-interleaves the combined soft-bit sequence according to a predetermined de-interleave function (i.e. the inverse of the interleaving function) to obtain the combined soft-bit sequence in a non-interleaved state. Step 660c is the same as the step 650a. As such, in this case the receiver apparatus 500 comprises interleaver logic to firstly interleave the second soft-bit sequence and de-interleaver logic to subsequently de-interleave the combined soft-bit sequence. Optionally, rather than performing the de-interleave function with respect to the combined soft-bit sequence (as shown in FIG. 6c), the receiver apparatus of some embodiments may instead input the combined soft-bit sequence in the interleaved state to the hard-output decoder logic 540 (e.g. a non-Viterbi decoder) to obtain a hard-bit sequence in the interleaved state and then de-interleave the hard-bit sequence according to the de-interleave function. Hence in FIG. 6c, the de-interleave step 650c may optionally be performed after the hard decode step 660c. However, for convolutional encoding techniques in which the transmitted bit sequence corresponds to a convolutional code, the non-interleaved combined bit-sequence is provided at the input to the hard-decoder logic comprising the convolutional decoder logic.

FIG. 6d is another schematic flow chart illustrating method operations performed by the receiver apparatus 500 in accordance with some embodiments of the invention for which the first and second OFDM symbols are encoded with a single bit per subcarrier (e.g. both encoded using BPSK, both encoded using QBPSK, or one being encoded using BPSK and the other being encoded using QBPSK), or a tuple of bits per subcarrier where each tuple is treated as a unit by the transmit-side interleaving. Step 610d is the same as the step 610a. At a step 620d, the receiver apparatus interleaves time-domain samples for the different subcarriers of the second OFDM symbol C2, after conversion to the frequency domain by an FFT, according to the predetermined interleave function, corresponding to the interleaving function that the transmitting apparatus 110 applied to the bits encoded on the first OFDM symbol, so as to re-order the subcarrier symbols of the second OFDM symbol. The predetermined interleave function re-orders the second plurality of subcarrier symbols (using frequency-domain processing) so that the reordered second subcarrier symbols encode the interleaved version of the transmitted bit sequence. At a step 630d the receiver apparatus soft-decodes the OFDM symbols C1 and C2 (which are both in a same interleaved state) and outputs the first OFDM symbols soft-bit sequence and the second OFDM symbols soft-bit sequence. Step 640d is the same as the step 640c, step 650d is the same as the step 650c, and step 660d is the same as the step 660c. As explained previously with respect to FIG. 6c, the de-interleaving step 650d may optionally be performed after the hard decode step 660d.

Hence more generally, the receiver apparatus 500 comprises de-interleave functionality for performing a predetermined de-interleave function, and there are a number of possibilities some of which include interleave functionality for performing a corresponding predetermined interleave function followed by performing the predetermined de-interleave function.

FIGS. 6a-6d have been described with reference to the first and second OFDM symbols that redundantly encode a transmitted bit sequence (e.g. the 52-bit HE-SIG-A1 as shown in FIG. 4). However, it is to be understood that the same techniques can be similarly applied for the third and fourth OFDM symbols that redundantly encode another transmitted bit sequence (e.g. the 52-bit HE-SIG-A2 as shown in FIG. 4).

As explained previously, the first and second OFDM symbols may in some cases encode a transmitted bit sequence that is a convolutional code generated by a convolution encoder. Specifically, in the case of the HE-SIG-A encoding scheme in FIG. 4, the first and second OFDM symbols encode a first half of a convolutional code and the third and fourth OFDM symbols encode a second half of the convolutional code, the convolutional code corresponding to the HE-SIG-A field. Hence, in some embodiments of the disclosure the hard-output decoder logic 540 comprises convolutional decoder logic configured to output the decoded hard-bit sequence. Specifically, the combiner logic 530 combines the two soft-bit sequences obtained for the first OFDM symbol and the second OFDM symbol and outputs a first combined soft-bit sequence comprising 52-bits (corresponding to HE-SIG-A1) and the combiner logic 530 also combines the two soft-bit sequences obtained for the third OFDM symbol and the fourth OFDM symbol and outputs a second combined soft-bit sequence comprising 52-bits (corresponding to HE-SIG-A2). Therefore, the first and second combined soft-bit sequences both in a non-interleaved state are input to the hard-output decoder logic 540 comprising convolutional decoder logic to decode the convolutional code and output a hard-bit sequence representing a decoding result for the HE-SIG-A field. Specifically, the first and second combined soft-bit sequences together define a 104-soft-bit sequence and the convolutional decoder convolutionally-decodes the 104 soft-bit sequence to obtain a hard-bit sequence of 52 bits corresponding to the HE-SIG-A field. In some examples, the convolutional decoder logic comprises Viterbi decoder logic for executing a Viterbi decoder algorithm. The hard-output decoder logic 540 may be a soft Viterbi decoder. In other embodiments, the transmitter may use a different channel coder, e.g. low-density parity-check (LDPC), in which case the hard-output decoder logic 540 may apply a different type of decoding to the combined soft-bit sequence, e.g. being a soft-bit LDPC decoder.

Referring again to FIG. 5a, the soft-output decoder logic 520 performs soft decoding of a received OFDM symbol and outputs one or more soft-bits. The soft-output decoder logic 520 may use any suitable soft decision decoding algorithm. For decoding the received OFDM symbols into soft-bits, the soft-output decoder logic 520 may use a maximum likelihood (ML) decoding algorithm. The decoder logic 520 may, in some embodiments, calculate log-likelihood ratio (LLR) values.

In some embodiments, the soft-output decoder logic 520 can be configured to calculate at least one log-likelihood ratio (LLR) for each subcarrier-symbol (e.g. each bit when using binary modulation), such that the soft output decoder outputs a first sequence of LLRs for the first plurality of subcarrier-symbols and also outputs a second sequence of LLRs for the second plurality of subcarrier-symbols. The combiner logic 530 can thus receive the first and second sequence of LLRs and perform arithmetic operations to combine the two soft-bit sequences, e.g. by summing (i.e. adding) respective values of the two sequences.

Therefore, the LLRs of the first sequence can be added to the LLRs of the second sequence to obtain a combined LLR value sequence (being an example of the combined soft-bit value sequence discussed above). The combined LLR sequence includes a respective combined LLR for each bit of the transmitted bit sequence. In some cases, a saturation condition may be implemented to cause saturation of a combined LLR when the combined LLR exceeds a saturation value. The hard-output decoder logic 540 receives the combined LLR sequence and outputs a hard-bit sequence. Generally, the hard decision decoding takes a stream of soft-bits or a block of soft-bits and hard-decodes each bit as a definite 1 (one) or 0 (zero).

Referring again to FIG. 5a, in some embodiments the soft-output decoder logic 520 comprises soft-output MIMO decoder logic configured to generate the first soft-bit sequence to include a respective log-likelihood ratio (LLR) for each bit of the first bit sequence and to generate the second soft-bit sequence to include a respective log-likelihood ratio (LLR) for each bit of the second bit sequence. The MIMO de-mapper may be configured to exploit space diversity, although in some embodiments it is configured for 1×1 operation. The soft-output decoder logic may comprise soft-output MIMO decoder logic such as that disclosed in U.S. Pat. No. 9,294,173 B2, the entire contents of which are incorporated herein by reference. It may comprise a soft-output MIMO decoder implemented as a processing block, which may include a processor and a memory that includes a program module and program data. The soft-output MIMO decoder logic may be configured to generate an LLR (being an example of a soft-bit) for each bit of a received transmit vector.

Figure 7:
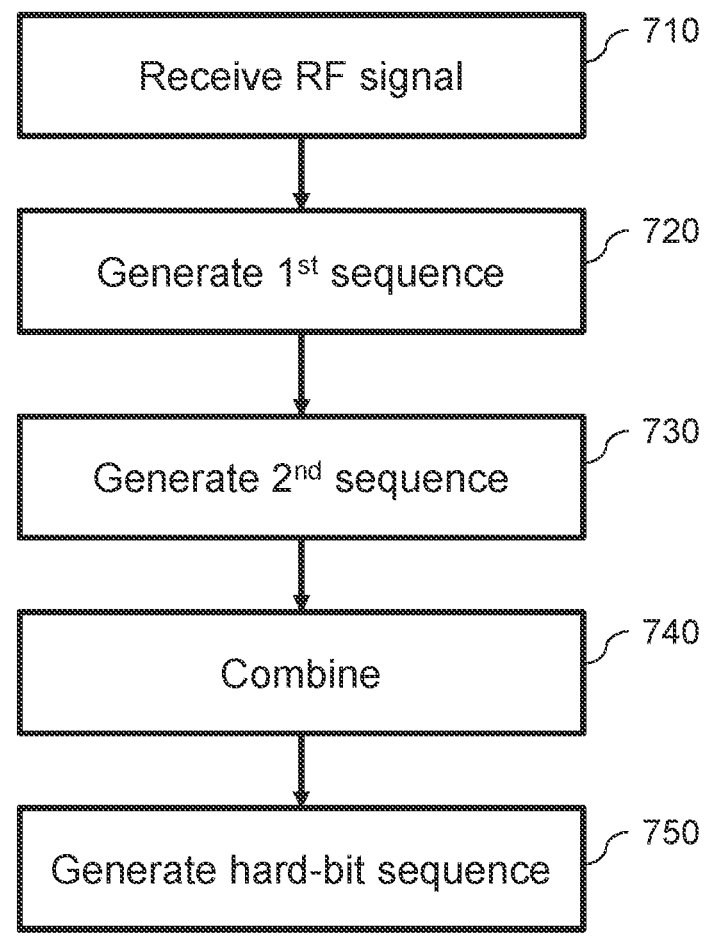
FIG. 7 is a schematic flowchart illustrating a method in accordance with embodiments of the present invention.

Referring now to FIG. 7, in accordance with embodiments of the invention, a method is provided comprising:
receiving (at a step 710) an OFDM radio-frequency signal encoding a transmitted bit sequence, the OFDM radio-frequency signal comprising a first OFDM symbol comprising a first plurality of subcarrier-symbols, modulated on a corresponding plurality of respective subcarriers, and a second OFDM symbol comprising a second plurality of subcarrier-symbols, modulated on the corresponding plurality of respective subcarriers, wherein the first plurality of subcarrier-symbols encodes the transmitted bit sequence as a first bit sequence and the second plurality of subcarrier-symbols encodes the transmitted bit sequence as a second bit sequence, the first bit sequence being an interleaved version of the second bit sequence according to a predetermined interleave function;
generating or determining (at a step 720) a first soft-bit sequence for the first plurality of subcarrier-symbols;
generating or determining (at a step 730) a second soft-bit sequence for the second plurality of subcarrier-symbols;
combining (at a step 740) the first soft-bit sequence and the second soft-bit sequence, with the first soft-bit sequence and the second soft-bit sequence either both in an interleaved state or both in a non-interleaved state, to obtain a combined soft-bit sequence, wherein combining the first soft-bit sequence and the second soft-bit sequence comprises combining a respective soft-bit having a bit position in the first soft-bit sequence with a respective soft-bit having a same bit position in the second soft-bit sequence; and
generating and/or outputting (at a step 750), in dependence upon the combined soft-bit sequence, a hard-bit sequence representing the transmitted bit sequence.

The applicants have recognised that improvements in bit error rate may be achieved by the receiver apparatus 500 combining soft-bit values from two different OFDM symbols even when no interleaving is used. Thus, in some embodiments, the receiver apparatus 500 is able to apply the combiner logic 530 to soft-bit sequences obtained from two OFDM symbols of a received OFDM signal without applying any de-interleaving (or interleaving) operations on either of the receiver OFDM symbols. The first and second OFDM symbols may be the L-SIG and RL-SIG symbols, respectively, of a currently-defined 802.11ax HE frame such as an HE-SU (high-efficiency single-user), HE-ER-SU, HE-MU (high-efficiency multi-user) or HE-TB (high-efficiency trigger-based) PPDU, or of a PPDU that is defined in any future version of the 802.11ax standard, such as an HE-ER-MU frame.

In some embodiments, the receiver apparatus 500 may be configured, for a single HE-ER-SU PPDU, to apply soft-bit combining (without de-interleaving) to the L-SIG and RL-SIG symbols of the PPDU, and also to apply soft-bit combining (with de-interleaving) to HE-SIG-A symbol of the same HE-ER-SU PPDU.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A receiver apparatus comprising:
   receiving circuitry configured to receive an OFDM radio-frequency signal encoding a transmitted bit sequence, the OFDM radio-frequency signal comprising a first OFDM symbol comprising a first plurality of subcarrier-symbols, modulated on a corresponding plurality of respective subcarriers, and a second OFDM symbol comprising a second plurality of subcarrier-symbols, modulated on the corresponding plurality of respective subcarriers, wherein the first plurality of subcarrier-symbols encodes the transmitted bit sequence as a first bit sequence and the second plurality of subcarrier-symbols encodes the transmitted bit sequence as a second bit sequence, the first bit sequence being an interleaved version of the second bit sequence according to a predetermined interleave function; and
   soft-output decoder logic, interleaver logic, combiner logic and hard-output decoder logic, each comprising respective circuitry or comprising respective software instructions stored in a memory of the receiver apparatus for execution by a processor of the receiver apparatus,
   wherein the soft-output decoder logic is configured to: generate a first output comprising a first soft-bit sequence for the first plurality of subcarrier-symbols; and generate a second output comprising a second soft-bit sequence for the second plurality of subcarrier-symbols;
   wherein the interleaver logic is configured to interleave the second soft-bit sequence, generated by the soft-output decoder logic, according to the predetermined interleave function to obtain the second soft-bit sequence in an interleaved state;
   wherein the combiner logic is configured to combine the first soft-bit sequence in an interleaved state and the second soft-bit sequence in the interleaved state to obtain a combined soft-bit sequence in an interleaved state, wherein the combiner logic is configured to combine a respective soft-bit having a bit position in the first soft-bit sequence with a respective soft-bit having a same bit position in the second soft-bit sequence; and
   wherein the hard-output decoder logic is configured to output, in dependence upon the combined soft-bit sequence, a hard-bit sequence for representing the transmitted bit sequence.

2. The receiver apparatus according to claim 1, comprising de-interleaver logic, the de-interleaver logic comprising circuitry or comprising software instructions stored in a memory of the receiver apparatus for execution by a processor of the receiver apparatus, wherein the de-interleaver logic is configured to de-interleave the first soft-bit sequence generated by the soft-output decoder logic according to a predetermined de-interleave function to obtain the first soft-bit sequence in a non-interleaved state.

3. The receiver apparatus according to claim 2, wherein the combiner logic is configured to combine the first soft-bit sequence in the non-interleaved state and the second soft-bit sequence in the non-interleaved state to obtain the combined soft-bit sequence.

4. The receiver apparatus according to claim 1, comprising pre-decoding de-interleaver logic, the pre-decoding de-interleaver logic comprising circuitry or comprising software instructions stored in a memory of the receiver apparatus for execution by a processor of the receiver apparatus, wherein the pre-decoding de-interleaver logic is configured to de-interleave the first plurality of subcarrier-symbols according to a predetermined de-interleave function to obtain the first plurality of subcarrier-symbols in a non-interleaved state prior to decoding by the soft-output decoder logic, and wherein the soft-output decoder is configured to generate the first output comprising the first soft-bit sequence in a non-interleaved state.

5. The receiver apparatus according to claim 1, comprising pre-decoding interleaver logic, the pre-decoding interleaver logic comprising circuitry or comprising software instructions stored in a memory of the receiver apparatus for execution by a processor of the receiver apparatus, wherein the pre-decoding interleaver logic is configured to interleave the second plurality of subcarrier-symbols according to the predetermined interleave function to obtain the second plurality of subcarrier-symbols in an interleaved state prior to decoding by the soft-output decoder logic, and wherein the soft-output decoder logic is configured to generate the second output comprising the second soft-bit sequence in an interleaved state.

6. The receiver apparatus according to claim 1, comprising de-interleaver logic, the de-interleaver logic comprising circuitry or comprising software instructions stored in a memory of the receiver apparatus for execution by a processor of the receiver apparatus, wherein the de-interleaver logic is configured to de-interleave the combined soft-bit sequence in the interleaved state to obtain the combined soft-bit sequence in a non-interleaved state for input to the hard-output decoder logic.

7. The receiver apparatus according to claim 1, wherein the hard-output decoder logic comprises convolutional decoder logic configured to output the hard-bit sequence.

8. The receiver apparatus according to claim 7, wherein the convolutional decoder logic comprises a Viterbi decoder.

9. The receiver apparatus according to claim 1, wherein the hard-output decoder logic is configured to output the hard-bit sequence in dependence upon the combined soft-bit sequence in the interleaved state, and the receiver apparatus further comprises de-interleaver logic, the de-interleaver logic comprising circuitry or comprising software instructions stored in a memory of the receiver apparatus for execution by a processor of the receiver apparatus, wherein the de-interleaver logic is configured to de-interleave the hard-bit sequence according to a predetermined de-interleave function.

10. The receiver apparatus according to claim 1, wherein the plurality of subcarriers further comprises a third OFDM symbol comprising a third plurality of subcarrier-symbols, modulated on a corresponding plurality of respective subcarriers, and a fourth OFDM symbol comprising a fourth plurality of subcarrier-symbols, modulated on the corresponding plurality of respective subcarriers, wherein the third plurality of subcarrier-symbols encodes a second transmitted bit sequence as a third bit sequence and the fourth plurality of subcarrier-symbols encodes the second transmitted bit sequence as a fourth bit sequence, the third bit sequence being an interleaved version of the fourth bit sequence according to the predetermined interleave function, and wherein:
   the soft-output decoder logic is further configured to: generate a third output comprising a third soft-bit sequence for the third plurality of subcarrier-symbols; and generate a fourth output comprising a fourth soft-bit sequence for the fourth plurality of subcarrier-symbols;
   the combiner logic is further configured to combine the third soft-bit sequence and the fourth soft-bit sequence with the third soft-bit sequence and the fourth soft-bit sequence either both in an interleaved state or both in a non-interleaved state to obtain a second combined soft-bit sequence, wherein the combiner logic is configured to combine a respective soft-bit having a bit position in the third soft-bit sequence with a respective soft-bit having a same bit position in the fourth soft-bit sequence; and the hard-output decoder logic is configured to output, in dependence upon the second combined soft-bit sequence, a second hard-bit sequence representing the second transmitted bit sequence.

11. The receiver apparatus according to claim 10, wherein the transmitted bit sequence corresponds to a portion of convolutionally encoded data and the second transmitted bit sequence corresponds to a remaining portion of the convolutionally encoded data, and wherein the hard-output decoder logic comprises convolutional decoder logic configured to output a hard-bit sequence representing a convolutional decoding of the data.

12. The receiver apparatus according to claim 10, wherein the first OFDM symbol, the third OFDM symbol and the fourth OFDM symbol are each modulated using binary phase shift keying (BPSK), the subcarriers of the third and fourth OFDM symbol being in phase with the subcarriers of the first OFDM symbol, and wherein the receiver apparatus further comprises rotation logic, the rotation logic comprising circuitry or comprising software instructions stored in a memory of the receiver apparatus for execution by a processor of the receiver apparatus, wherein the rotation logic is configured to apply a ninety degree phase adjustment to the subcarriers of the second OFDM symbol so that the second OFDM symbol is in phase with the first OFDM symbol, the third OFDM symbol and the fourth OFDM symbol prior to decoding by the soft-output decoder logic.

13. The receiver apparatus according to claim 1, wherein the subcarriers of the first OFDM symbol are modulated using binary phase shift keying (BPSK) and the subcarriers of the second OFDM symbol are modulated using quadrature binary phase shift keying (QBPSK), wherein the subcarriers of the second OFDM symbol are ninety degrees out of phase with respect to the subcarriers of the first OFDM symbol, and wherein the receiver apparatus further comprises rotation logic, the rotation logic comprising circuitry or comprising software instructions stored in a memory of the receiver apparatus for execution by a processor of the receiver apparatus, wherein the rotation logic is configured to apply a ninety degree phase adjustment to the subcarriers of the second OFDM symbol so that the first OFDM symbol and the second OFDM symbol are in phase prior to decoding by the soft-output decoder logic.

14. The receiver apparatus according to claim 1, wherein the soft-output decoder logic is configured to generate the first soft-bit sequence to include a respective log-likelihood ratio for each bit of the first bit sequence and to generate the second soft-bit sequence to include a respective log-likelihood ratio for each bit of the second bit sequence.

15. The receiver apparatus according to claim 14, wherein, for each respective log-likelihood ratio in the first soft-bit sequence, the combiner logic is configured to add a respective log-likelihood ratio having a bit position in the first soft-bit sequence to a respective log-likelihood ratio having a same bit position in the second soft-bit sequence to thereby obtain the combined soft-bit sequence.

16. A system comprising:
the receiver apparatus according to claim 1; and
a transmitter apparatus configured to transmit the OFDM radio-frequency signal to the receiver apparatus as a radio signal.

17. A method comprising:
receiving an OFDM radio-frequency signal encoding a transmitted bit sequence, the OFDM radio-frequency signal comprising a first OFDM symbol comprising a first plurality of subcarrier-symbols, modulated on a corresponding plurality of subcarriers, and a second OFDM symbol comprising a second plurality of subcarrier-symbols, modulated on the corresponding plurality of subcarriers, wherein the first plurality of subcarrier-symbols encodes the transmitted bit sequence as a first bit sequence and the second plurality of subcarrier-symbols encodes the transmitted bit sequence as a second bit sequence, the first bit sequence being an interleaved version of the second bit sequence according to a predetermined interleave function;
determining a first soft-bit sequence for the first plurality of subcarrier-symbols;
determining a second soft-bit sequence for the second plurality of subcarrier-symbols;
interleaving the second soft-bit sequence according to the predetermined interleave function to obtain the second soft-bit sequence in an interleaved state;
combining the first soft-bit sequence in an interleaved state and the second soft-bit sequence in the interleaved state to obtain a combined soft-bit sequence in an interleaved state, wherein combining the first soft-bit sequence and the second soft-bit sequence comprises combining a respective soft-bit having a bit position in the first soft-bit sequence with a respective soft-bit having a same bit position in the second soft-bit sequence; and
generating, in dependence upon the combined soft-bit sequence, a hard-bit sequence representing the transmitted bit sequence.

18. A non-transitory computer-readable medium storing instructions which, when executed by one or more processors of a receiving apparatus, cause the receiving apparatus to:
process data representative of a received OFDM radio signal encoding a transmitted bit sequence, the OFDM radio signal comprising a first OFDM symbol comprising a first plurality of subcarrier-symbols, modulated on a corresponding plurality of subcarriers, and a second OFDM symbol comprising a second plurality of subcarrier-symbols, modulated on the corresponding plurality of subcarriers, wherein the first plurality of subcarrier-symbols encodes the transmitted bit sequence as a first bit sequence and the second plurality of subcarrier-symbols encodes the transmitted bit sequence as a second bit sequence, the first bit sequence being an interleaved version of the second bit sequence according to a predetermined interleave function;
determine a first soft-bit sequence for the first plurality of subcarrier-symbols;
determine a second soft-bit sequence for the second plurality of subcarrier-symbols;
interleave the second soft-bit sequence according to the predetermined interleave function to obtain the second soft-but sequence in an interleaved state;
combine the first soft-bit sequence in an interleaved state and the second soft-bit sequence in the interleaved state to obtain a combined soft-bit sequence in an interleaved state, wherein combining the first soft-bit sequence and the second soft-bit sequence comprises combining a respective soft-bit having a bit position in the first soft-bit sequence with a respective soft-bit having a same bit position in the second soft-bit sequence; and generate, in dependence upon the combined soft-bit sequence, a hard-bit sequence representing the transmitted bit sequence.

\* \* \* \* \*